US008982117B2

(12) United States Patent  
Park et al.

(10) Patent No.: US 8,982,117 B2
(45) Date of Patent: Mar. 17, 2015

(54) DISPLAY APPARATUS AND METHOD OF DISPLAYING THREE-DIMENSIONAL IMAGE USING SAME

(75) Inventors: Cheolwoo Park, Suwon-si (KR);
Joo-Young Kim, Suwon-si (KR);
Mun-San Park, Hwaseong-si (KR);
Jung-taek Kim, Seoul (KR);
Geunjeong Park, Daegu (KR);
KyoungHo Lim, Yongin-si (KR);
Ji-woong Jeong, Yongin-si (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 355 days.

(21) Appl. No.: 13/529,731

(22) Filed: Jun. 21, 2012

(65) Prior Publication Data

US 2012/0327079 A1   Dec. 27, 2012

(30) Foreign Application Priority Data

Jun. 22, 2011  (KR) ........................ 10-2011-0060704
Jan. 4, 2012    (KR) ........................ 10-2012-0001011

(51) Int. Cl.
*G06T 15/00*   (2011.01)
*G09G 5/00*    (2006.01)
*H04N 13/04*   (2006.01)
*H04N 13/00*   (2006.01)

(52) U.S. Cl.
CPC ....... *H04N 13/0404* (2013.01); *H04N 13/0497* (2013.01); *H04N 13/0022* (2013.01)
USPC ............................. 345/419; 348/51; 345/611

(58) Field of Classification Search
None
See application file for complete search history.

(56) References Cited

U.S. PATENT DOCUMENTS

| 2004/0008251 | A1* | 1/2004  | Mashitani et al. ............... 348/51 |
| 2006/0078180 | A1* | 4/2006  | Berretty et al. ............... 382/128 |
| 2009/0324059 | A1  | 12/2009 | Boughorbel |
| 2010/0007661 | A1* | 1/2010  | Kim et al. ..................... 345/419 |

(Continued)

FOREIGN PATENT DOCUMENTS

| JP | 2004-078086 | 3/2004 |
| JP | 2005-128522 | 5/2005 |

(Continued)

OTHER PUBLICATIONS

English Abstrct for Publication No. 10-2010-0007079.

(Continued)

*Primary Examiner* — Joni Richer
*Assistant Examiner* — Yi Wang
(74) *Attorney, Agent, or Firm* — F. Chau & Associates, LLC

(57) ABSTRACT

A display apparatus includes a display panel configured to include a plurality of pixels and display an image having a plurality of viewpoints in response to a data signal and a control signal, a converter, and a driver. The converter is configured to receive a first image signal and a first control signal, the first image signal including an image data and a depth data corresponding to the image data and a first control signal, the converter further configured to generate a converted depth data corresponding to a predetermined pixel on the basis of the first image signal, and output a second image signal having the viewpoints and a second control signal based on the image data and the converted depth data. The driver is configured to receive the second image signal and the second control signal and output the data signal and the control signal to the display panel.

16 Claims, 18 Drawing Sheets

(56) References Cited

U.S. PATENT DOCUMENTS

2011/0096832 A1* 4/2011 Zhang et al. ............. 375/240.08
2011/0122236 A1* 5/2011 Yamada et al. ................. 348/55

FOREIGN PATENT DOCUMENTS

| KR | 10-2009-0089694 | 8/2009 |
| KR | 10-2010-0007079 | 1/2010 |
| KR | 10-2010-0008649 | 1/2010 |
| KR | 10-2010-0009739 | 1/2010 |
| KR | 10-2010-0075329 | 7/2010 |

OTHER PUBLICATIONS

English Abstrct for Publication No. 10-2010-0008649.
English Abstrct for Publication No. 10-2010-0075329.
English Abstrct for Publication No. 10-2009-0089694.
English Abstrct for Publication No. 10-2010-0009739.
English Abstrct for Publication No. 2004-078086.
English Abstrct for Publication No. 2005-128522.

* cited by examiner

DISPLAY APPARATUS AND METHOD OF DISPLAYING THREE-DIMENSIONAL IMAGE USING SAME

CROSS-REFERENCE TO RELATED APPLICATION

This application claims priority under 35 U.S.C §119 to Korean Patent Application No. 10-2011-0060704, filed on Jun. 22, 2011 and Korean Patent Application No. 10-2012-0001011, field on Jan. 4, 2012, the disclosures of which are herein incorporated by reference in their entirety.

BACKGROUND

1. Technical Field

The present disclosure relates to a display apparatus and a method of displaying a three-dimensional (3D) image using the same.

2. Description of Related Art

In general, three dimensional (3D) image display technology creates a stereoscopic effect using the concept of binocular parallax or binocular disparity. Binocular parallax uses a difference in an object's location as seen from two different points (e.g., two different lens or a viewer's eyes) to create the stereoscopic effect. The binocular parallax is an important factor for achieving the stereoscopic effect at a short distance.

3D displays using binocular disparity may be classified into two types, e.g., a stereoscopic 3D display and an autostereoscopic 3D display. The stereoscopic 3D display may be classified as using an anaglyph method in which the viewer wears a blue eye-glass and a red eye-glass for each of the viewer's eyes, or a shutter glass method using stereoscopic glasses in which a left-eye shutter and a right-eye shutter alternately open in synchronization with a display period of a left-eye image and a right-eye image.

In the case of the autostereoscopic 3D display, a lenticular method may be used to provide a plurality of viewpoints. In the autostereoscopic 3D display using the lenticular method a resolution of the 3D image is lowered with an increase in the number of the viewpoints.

SUMMARY

According to an exemplary embodiment of the present disclosure, a display apparatus includes a display panel, a converter, and a driver.

The display panel is configured to include a plurality of pixels and display an image having a plurality of viewpoints in response to a data signal and a control signal. The converter is configured to receive a first image signal and a first control signal, the first image signal including an image data and a depth data corresponding to the image data and a first control signal, the converter further configured to generate a converted depth data corresponding to a predetermined pixel on the basis of the first image signal, and output a second image signal having the viewpoints and a second control signal based on the image data and the converted depth data. The driver is configured to receive the second image signal and the second control signal and output the data signal and the control signal to the display panel.

According to an exemplary embodiment of the present disclosure, a lens plate may be configured to include a plurality of lenses, the lenses being disposed on a display panel to display a three-dimensional image, and a lens driving unit configured to move the lenses to positions corresponding to a first sub-frame or a second sub-frame in response to a lens control signal.

According to an exemplary embodiment of the present disclosure, a converter may convert image data to a first sub-image signal and a second sub-image signal respectively corresponding to first and second sub-frames and outputs a lens control signal.

According to an exemplary embodiment of the present disclosure, a driver may output a lens control signal and a second image signal in response to first and second sub-image signals.

According to an exemplary embodiment of the present disclosure, a method of displaying a 3D image on a display apparatus having a plurality of pixels includes receiving a first image signal including an image data and a depth data corresponding to the image data, generating a converted depth data corresponding to a predetermined pixel based on the first image signal, generating a second image signal having a plurality of viewpoints based on the image data and the converted depth data, and controlling the second image signal to be displayed on the pixels.

According to an exemplary embodiment of the present disclosure, a method of displaying a 3D image includes receiving a first image signal, converting the first image signal of one frame to sub-image signals respectively corresponding to N sub-frames, where N is a positive whole number, to supply a first sub-image signal during a first sub-frame and a second sub-image signal during a second sub-frame, rendering the first sub-image signal with reference to a first look-up table during the first sub-frame to output a second image signal, and rendering the second sub-image signal with reference to a second look-up table during the second sub-frame to output the second image signal.

According to an exemplary embodiment of the present disclosure, a method of displaying a three-dimensional image on a display apparatus having a plurality of pixels includes receiving a first image signal including an image data and a depth data corresponding to the image data, generating a converted depth data corresponding to the plurality of pixels based on the first image signal, wherein generating the converted depth data includes a hole filing method for filling a blank data section corresponding to at least one pixel having no depth data, generating a second image signal having a plurality of viewpoints based on the image data and the converted depth data, wherein generating the second image signal includes an anti-aliasing of the converted depth data, and controlling the second image signal to be displayed on the pixels.

BRIEF DESCRIPTION OF THE DRAWINGS

Exemplary embodiments of the present invention will become readily apparent by reference to the accompanying drawings wherein.

DETAILED DESCRIPTION

Exemplary embodiments of the present invention will be explained in detail with reference to the accompanying drawings.

Figure 1:
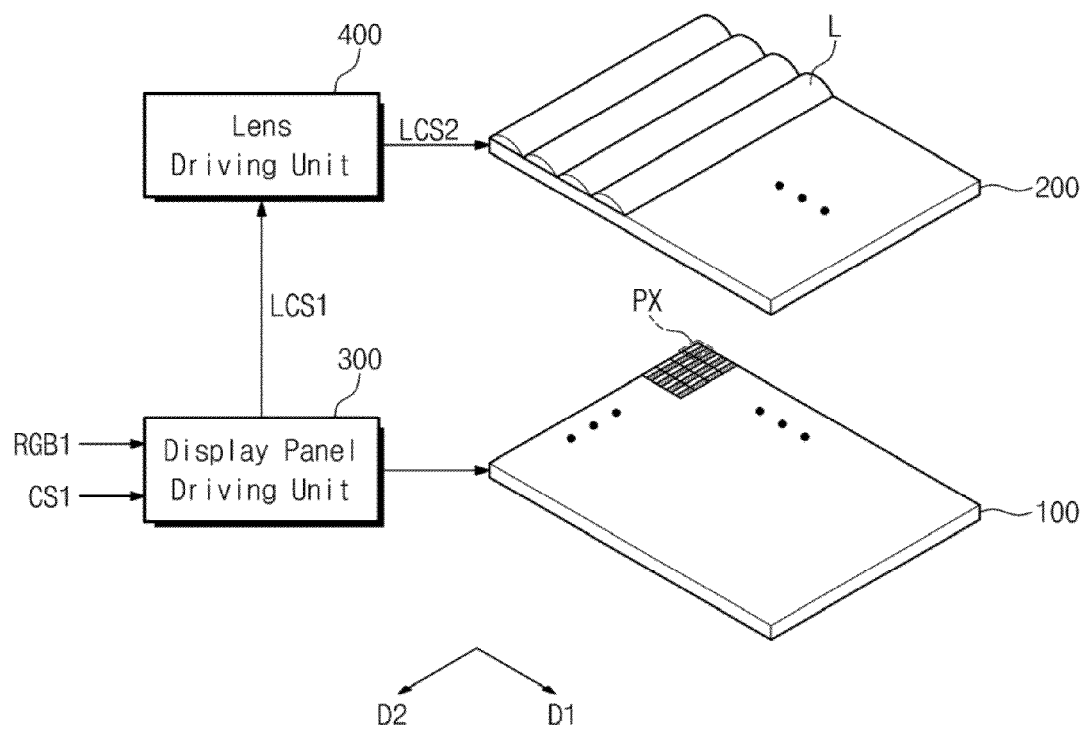
FIG. 1 is a perspective view showing a display apparatus according to an exemplary embodiment of the present invention.
Figure 2:
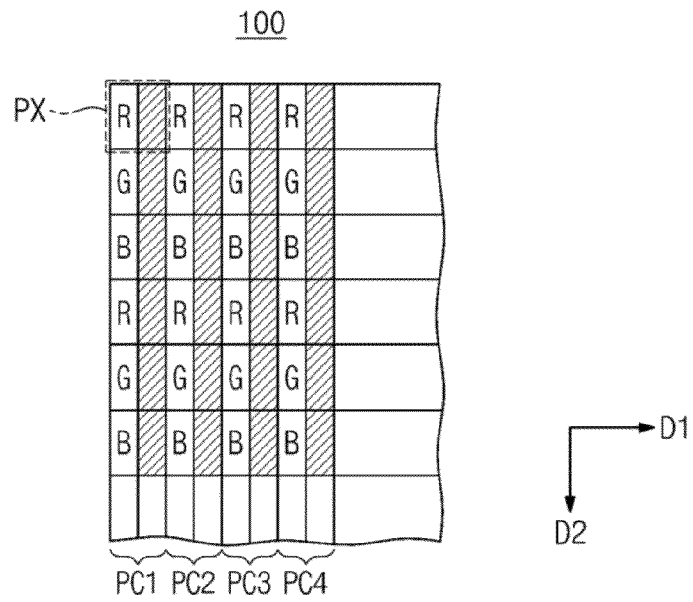
FIG. 2 is a plan view showing a display panel of FIG. 1.

FIG. 1 is a perspective view showing a display apparatus according to an exemplary embodiment of the present invention. FIG. 2 is a plan view showing a display panel of FIG. 1.

Referring to FIGS. 1 and 2, a display apparatus includes a display panel 100, a lens plate 200, a display panel driving unit 300, and a lens driving unit 400.

The display panel 100 is configured to display an image. The display panel 100 includes a plurality of pixels PX arranged in a matrix form. The pixels PX are arranged in a first direction D1 to form pixel rows and in a second direction D2 to form pixel columns. The first direction D1 crosses the second direction D2 and is substantially perpendicular to the second direction D2.

Among the pixel rows, a first pixel row includes red pixels R, a second pixel row includes green pixels G, and a third pixel row includes blue pixels B. The first, second, and third pixel rows are repeatedly arranged along the second direction D2.

The pixel columns are repeatedly arranged along the first direction D1, and four pixel columns have been shown in FIG. 2 as an example. Each of first, second, third, and fourth pixel columns PC1, PC2, PC3, and PC4 includes the red, green, and blue pixels R, G, and B alternately arranged in the second direction D2. Different from the arrangement shown in FIGS. 1 and 2, each of the first, second, third, and fourth pixel columns PC1, PC2, PC3, and PC4 may include color pixels of a single color, while each of the first, second, and third pixel rows may include the red, green, and blue pixels R, G, and B alternately arranged in the first direction D1.

Each pixel PX has a rectangular shape with opposite sides having a same length. According to an exemplary embodiment, the pixel PX may have two long sides and two short sides, wherein the long sides of the pixel PX correspond to the second direction D2 and the short sides of the pixel PX correspond to the first direction D1, but they should not be limited thereto or thereby. That is, the long sides of the pixel PX may be disposed to correspond to the first direction D1 and the short sides of the pixel PX may be disposed to correspond to the second direction D2.

The display panel 100 may include a first substrate, a second substrate facing the first substrate, and a liquid crystal layer disposed between the first substrate and the second substrate. The first substrate may include a pixel electrode, a gate line, and a data line, and the second substrate may include a common electrode and a color filter.

The lens plate 200 is disposed on the display panel 100. The lens plate 200 includes a plurality of lenses L. The lenses L convert a two-dimensional (2D) image displayed by the display panel 100 into a three-dimensional (3D) image.

The lenses L are each extended in the second direction D2. The lenses L are arranged in the first direction D1. That is, the direction in which the lenses L are extended may be substantially parallel to the column direction of the pixels. Each lens L may have a width in the first direction D1 corresponding to a width of a plurality of pixels PX in the first direction D1. In detail, the width of each lens L in the first direction D1 may be the same as the combined width of four pixels in the first direction D1. In this case, the number of viewpoints of the 3D image may be four. In addition, the width of each lens L in the first direction D1 may be the same as the width of eight pixels in the first direction D1. In this case, the number of viewpoints of the 3D image may be eight. Each lens L has a convex shape protruding upward, away from the display panel 100.

The lens plate 200 may be a liquid crystal lens panel that is driven with a voltage. In this case, the lenses L of the lens plate 200 may not have any physical form or shape, may be defined by an electric field applied to the liquid crystal lens panel.

The display panel driving unit 300 is connected to the display panel 100 and outputs a signal to drive the display panel 100. The display panel driving unit 300 time-divides a first image signal RGB1 of one frame into N sub-frames to drive the display panel 100. "N" is a natural number. For example, when N is 2, the display panel driving unit 300 generates a first sub-image signal RGBO corresponding to a first sub-frame and a second sub-image signal RGBE corresponding to a second sub-frame based on the first image signal RGB1. The first image signal RGB1 may be provided from an external device. The display panel driving unit 300 controls the display panel 100 to allow the first sub-image signal RGBO to be displayed on the display panel 100 during the first sub-frame. In addition, the display panel driving unit 300 controls the display panel 100 to allow the second sub-image signal RGBE to be displayed on the display panel 100 during the second sub-frame. According to an exemplary embodiment, the first sub-image signal RGBO may be a left-eye image signal and the second sub-image signal RGBE may be a right-eye image signal.

In a case where the width of each lens L in the first direction D1 is equal to the width of four pixels in the first direction D1, four viewpoints of the 3D image are created due to the lens L, with eight viewpoints of the 3D image created in total due to the time-division drive.

The display panel driving unit 300 may be operated in a time-division driving mode and a normal driving mode. During the time-division driving mode, the display panel driving unit 300 outputs a lens control signal LCS1 to control the lens driving unit 400. The configuration and operation of the display panel driving unit 300 is described in detail herein.

The lens driving unit 400 is connected to the lens plate 200 and outputs a lens driving signal LCS2 to drive the lenses L. According to an exemplary embodiment of the present disclosure, the lens driving unit 400 may physically move the lens plate 200, and thus the lenses L are driven as the lens plate 200 moves, or control the electric field applied to a liquid crystal lens panel to drive the lenses L. That is, in the case that the lens plate 200 is the liquid crystal lens panel that is driven with the voltage, the lens driving unit 400 does not physically move the lens plate 200.

The lens driving unit 400 positions the lenses L at a first position during the first sub-frame. During the second sub-frame, the lens driving unit 400 positions the lenses L at a second position shifted from the first position by a value obtained by dividing the width of the pixel PX by N. For example, when N is 2, the lens driving unit 400 shifts the lenses L by a half of the width of the pixel PX during the second sub-frame.

Figure 3:
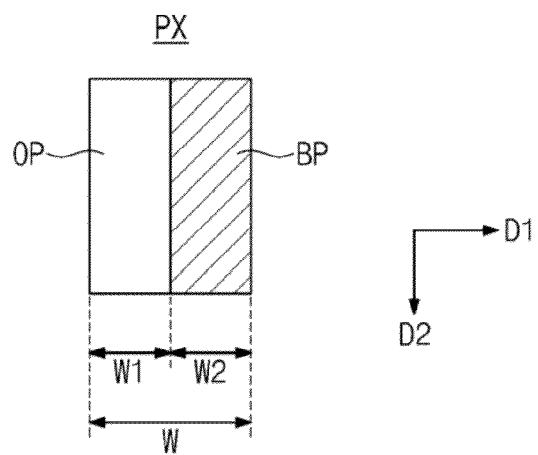
FIG. 3 is a plan view showing a pixel of FIG. 1.

FIG. 3 is a plan view showing a pixel of FIG. 1.

Referring to FIG. 3, the pixel PX includes an open area OP and a block area BP. The block area BP may be disposed adjacent to the open area OP in the first direction D1.

The open area OP is defined by the color filter of the display panel 100 and the block area BP is defined by a black matrix of the display panel 100. That is, the color filter is disposed in the open area OP and the black matrix is disposed in the block area BP.

The open area OP has a first width W1 in the first direction D1 and the block area BP has a second width W2 in the first direction D1. The width of the pixel PX in the first direction D1 is substantially equal to a sum of the first and second widths (W1+W2).

An aperture ratio of the pixel PX is defined as a ratio of the first width W1 of the open area OP to the width W of the pixel PX. When the display panel 100 time-divides one frame into N sub-frames, the aperture ratio of the pixel PX becomes about 1/N. In the exemplary case of N=2, the aperture ratio (W1/W) is 0.5. That is, a ratio of the first width W1 of the open area OP to the second width W2 of the block area BP is 1:1.

Figure 4A:
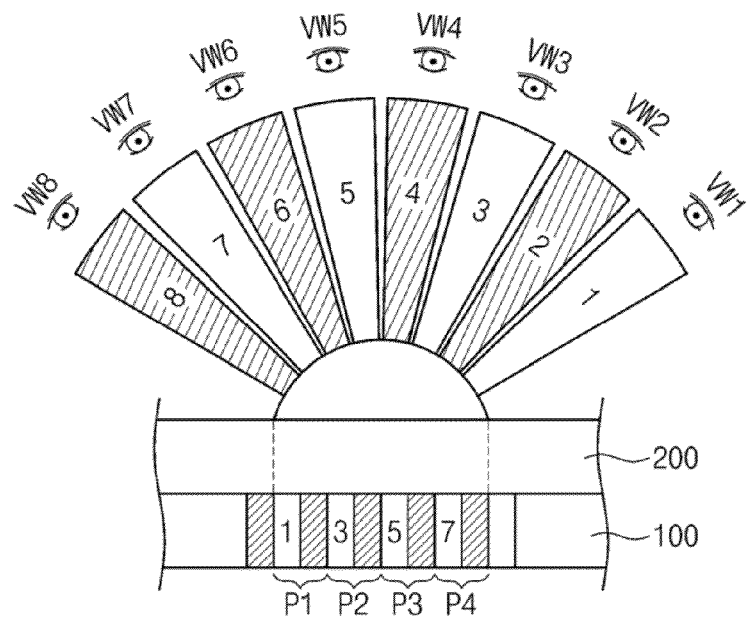
FIG. 4A is a cross-sectional view showing a relative position of a display panel and a lens plate of FIG. 1 during a first sub-frame.
Figure 4B:
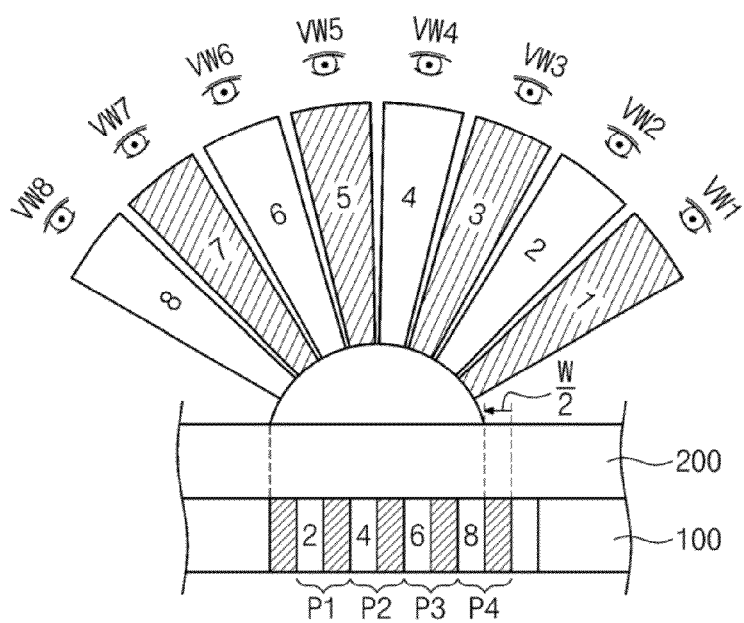
FIG. 4B is a cross-sectional view showing a relative position of a display panel and a lens plate of FIG. 1 during a second sub-frame.

FIG. 4A is a cross-sectional view showing a relative position of the display panel 100 and the lens plate 200 of FIG. 1 during the first sub-frame. FIG. 4B is a cross-sectional view showing a relative position of the display panel 100 and the lens plate 200 of FIG. 1 during the second sub-frame.

Referring to FIGS. 3, 4A, and 4B, the display panel 100 includes first, second, third, and fourth pixels P1, P2, P3, and P4. Each of the first, second, third, and fourth pixels P1, P2, P3, and P4 has the width W and the aperture ratio of about 0.5.

The lens plate 200 is disposed on the display panel 100. One lens of the lens plate 200 has the width corresponding to the combined width of four pixels. That is, the lens has the width of the width of the first, second, third, and fourth pixels P1, P2, P3, and P4.

Referring to FIG. 4A, the display panel driving unit 300 applies the first sub-image signal RGBO to the display panel 100 during the first sub-frame. The first sub-image signal RGBO includes an image signal corresponding to odd-numbered viewpoints, e.g., a first viewpoint VW1, a third viewpoint VW3, a fifth viewpoint VW5, and a seventh viewpoint VW7. The first pixel P1 displays the image corresponding to the first viewpoint VW1 of the first sub-image signal RGBO, the second pixel P2 displays the image corresponding to the third viewpoint VW3 of the first sub-image signal RGBO, the third pixel P3 displays the image corresponding to the fifth viewpoint VW5 of the first sub-image signal RGBO, and the fourth pixel P4 displays the image corresponding to the seventh viewpoint VW7 of the first sub-image signal RGBO. The lens driving unit 400 applies the lens driving signal LCS2 to the lens plate 200 in response to the lens control signal LCS1 provided from the display panel driving unit 300 so as to dispose the lens at the first position corresponding to a boundary of the first pixel P1 and a boundary of the fourth pixel P4.

Referring to FIG. 4B, the display panel driving unit 300 controls the display panel 100 such that the second sub-image signal RGBE is displayed on the display panel 100 during the second sub-frame. The second sub-image signal RGBE includes an image signal corresponding to even-numbered viewpoints, e.g., a second viewpoint VW2, a fourth viewpoint VW4, a sixth viewpoint VW6, and an eighth viewpoint VW8. The first pixel P1 displays the image corresponding to the second viewpoint VW2, the second pixel P2 displays the image corresponding to the fourth viewpoint VW4, the third pixel P3 displays the image corresponding to the sixth viewpoint VW6, and the fourth pixel P4 displays the image corresponding to the eighth viewpoint VW8. The lens driving unit 400 applies the lens driving signal LCS2 to the lens plate 200 in response to the lens control signal LCS1 provided from the display panel driving unit 300 so as to dispose the lens at the second position left-shifted from the first position by the half (W/2) of the width of the pixel.

Referring to FIGS. 4A and 4B, for example, when the left eye of the viewer is positioned at the first viewpoint VW1 and the right eye of the viewer is positioned at the second viewpoint VW2, the left eye of the viewer perceives the image of the first viewpoint VW1 of the first sub-image signal RGBO through the open area OP during the first frame, and the right eye of the viewer perceives a black image by the block area BP during the first frame. During the second frame, the right eye of the viewer perceives the image of the second viewpoint VW2 of the second sub-image signal RGBE through the open area OP and the left eye of the viewer perceives the black image by the block area BP. Consequently, the viewer may perceive the 3D image by mixing the image of the first viewpoint VW1 in the first frame with the image of the second viewpoint VW2 in the second frame.

For example, when the left eye of the viewer is positioned at the second viewpoint VW2 and the right eye of the viewer is positioned at the third viewpoint VW3, the right eye of the viewer perceives the image of the third viewpoint VW3 of the first sub-image signal RGBO through the open area OP during the first frame, and the left eye of the viewer perceives the black image by the block area BP during the first frame. During the second frame, the left eye of the viewer perceives the image of the second viewpoint VW2 of the second sub-image signal RGBE through the open area OP and the right-eye of the viewer perceives the black image by the block area BP. Consequently, the viewer may perceive the 3D image by mixing the image of the third viewpoint VW3 in the first frame with the image of the second viewpoint VW2 in the second frame.

As described herein, since the ratio of the width W1 of the open area OP to the width W2 of the block area BP in the pixel PX is 1:1, an image corresponding to the open areas and a black image corresponding to the bock areas are repeatedly displayed in each viewpoint at regular intervals. Thus, the display apparatus may provide an effect similar to that of a display apparatus employing shutter glasses. A display apparatus according to an exemplary embodiment of the present exemplary embodiment may prevent the left-eye image from being provided to the right eye or the right-eye image from being provided to the left eye, thereby substantially preventing a crosstalk phenomenon.

According to an exemplary embodiment of the present disclosure, P viewpoints are generated by using the lens, and N viewpoints are generated by time-division driving of the display panel, so (P×N) viewpoints may be generated on the display apparatus.

In addition, the aperture ratio of the pixel may be controlled in accordance with the time-division drive, and therefore the crosstalk phenomenon and moiré phenomenon may be substantially prevented.

Figure 5:
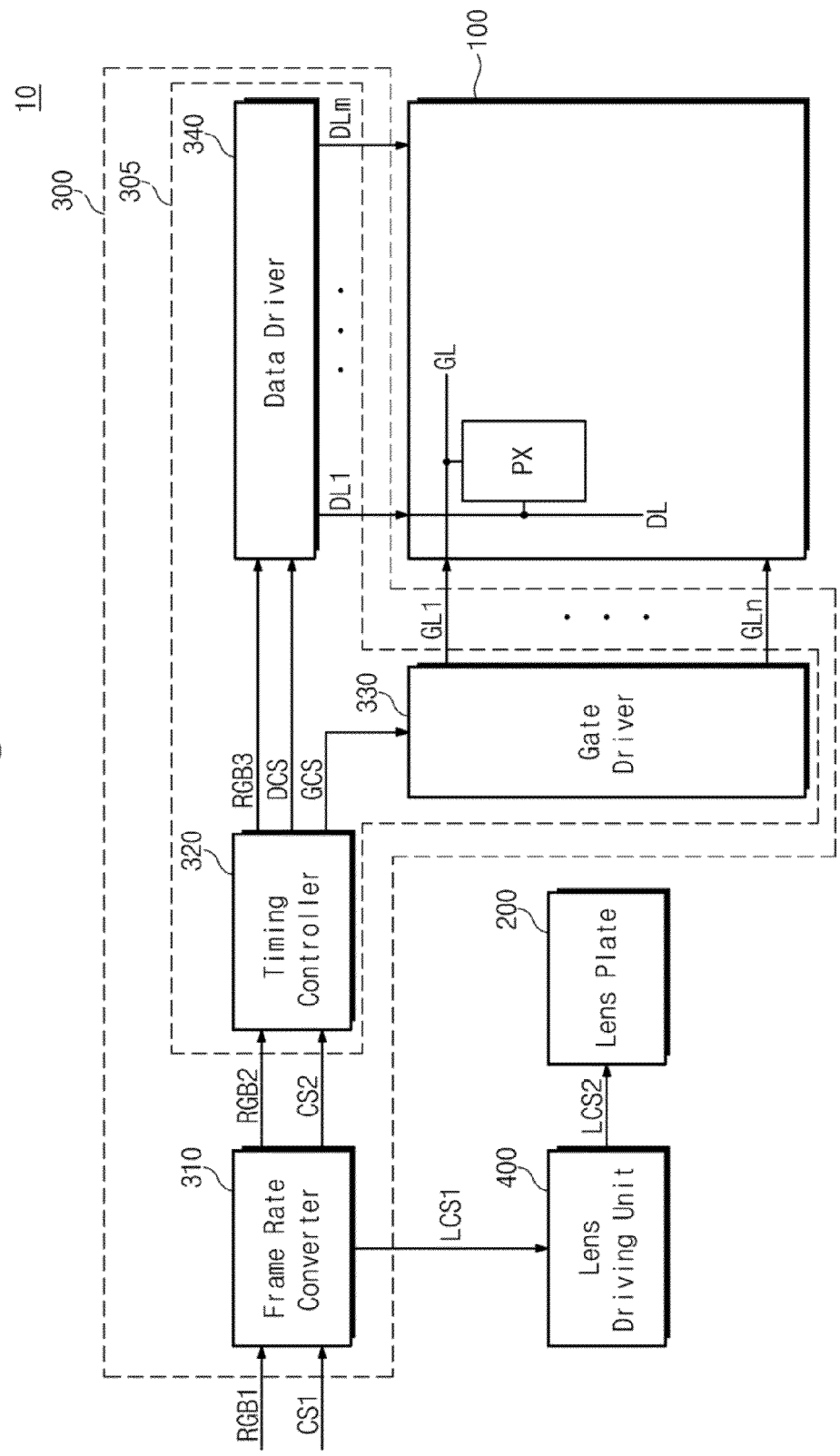
FIG. 5 is a block diagram specifically showing a configuration of a display panel driving unit of FIG. 1.

FIG. 5 is a block diagram showing an exemplary configuration of the display panel driving unit of FIG. 1.

Referring to FIG. 5, the display panel driving unit 300 may include a frame rate converter 310 and a driving unit 305. The driving unit 305 may include a timing controller 320, a gate driver 330, and a data driver 340. The frame rate converter 310 receives a first image signal RGB1 and a first control signal CS1 and outputs a second image signal RGB2 and a second control signal CS2 to the timing controller 320. The first image signal RGB1 includes image data used to display the 2D image and depth data. The depth data relates to a distance from the display panel 100 to a position in front of the display panel 100, at which the 2D image data may be perceived in three dimensions. To this end, the depth data includes values of 256 levels of gray scales. The frame rate converter 310 outputs the second image signal RGB2 and the second control signal CS2, which are used to display the 3D image, using the first image signal RGB1 and the first control signal CS1. The first image signal RGB1 and the first control signal CS1 may be received from an external device. The frame rate converter 310 outputs the lens control signal LCS1 to control the lens driving unit 400. An exemplary configuration and operation of the frame rate converter 310 is described herein.

The timing controller 320 receives the second image signal RGB2 and the second control signal CS2 from the frame rate converter 310 and outputs a gate control signal GCS used to control the gate driver 330, and a data control signal DCS and a third image signal RGB3, which are used to control the data driver 340. The gate driver 330 generates gate signals G1 to Gn in response to the gate control signal GCS and applies the gate signals G1 to Gn to the display panel 100. The data driver 340 generates data voltages D1 to Dm in response to the third image signal RGB3 from the timing controller 320 and applies the data voltages D1 to Dm to the display panel 100.

The display panel 100 includes a plurality of gate lines GL1 to GLn to which the gate signals G1 to Gn are respectively applied, a plurality of data lines DL1 to DLm to which the data voltages D1 to Dm are respectively applied, and a plurality of pixels PX.

According to exemplary embodiment of the present disclosure, the pixels PX of the display panel 100 have the same configuration and function as one another, and thus one pixel has been shown in FIG. 5 as a representative example. Each pixel PX may include a thin film transistor and a pixel electrode. The thin film transistor may include a gate electrode connected to a corresponding one of the gate lines GL1 to GLn, a source electrode connected to a corresponding one of the data lines DL1 to DLm, and a drain electrode connected to the pixel electrode.

The gate driver 330 is electrically connected to the gate lines GL1 to GLn of the display panel 100 and applies a gate voltage to the gate lines GL1 to GLn. In detail, the gate driver 330 may generate the gate signals G1 to Gn, each having a gate-on voltage VON and a gate-off voltage VOFF, based on the gate control signal GCS from the timing controller 320 so as to drive the gate lines GL1 to GLn. The gate driver 330 sequentially applies the gate signals G1 to Gn to the gate lines GL1 to GLn. The gate control signal GCS may include a vertical start signal that starts an operation of the gate driver 330, a gate clock signal that determines an output timing of the gate voltage, and an output enable signal that determines an ON pulse width of the gate voltage.

While the gate driver 330 is shown in FIG. 5 as being separately formed from the display panel 100, according to an exemplary embodiment, the gate driver 330 may be directly integrated on the display panel 100 by using amorphous silicon gate (ASG) technology. In addition, when the gate driver 330 is embodied on an amorphous silicon glass substrate using a system-on-glass (SOG) method, a circuit area and the number of components for the gate driver 330 may be reduced.

The data driver 340 receives the third image signal RGB3 and the data control signal DCS from the timing controller 320. The data driver 340 may apply the data voltages D1 to Dm corresponding to the third image signal RGB3 to the data lines DL1 to DLm in response to the data control signal DCS. The data control signal DCS may include a horizontal start signal that starts an operation of the data driver 340, an inversion signal that inverts a polarity of left- and right-eye data voltages, and a load signal that determines an output timing of the left-eye and right-eye data voltages from the data driver 340.

The thin film transistor in each pixel PX may be turned on in response to the gate signal provided through the corresponding gate line of the gate lines GL1 to GLn, and the data voltage applied to the corresponding data line of the data lines DL1 to DLm may be applied to the pixel electrode through the source and drain electrodes of the turned-on thin film transistor.

Although not shown in figures, the display apparatus may further include a backlight unit disposed adjacent to the display panel 100 to supply light to the display panel 100.

Figure 6A:
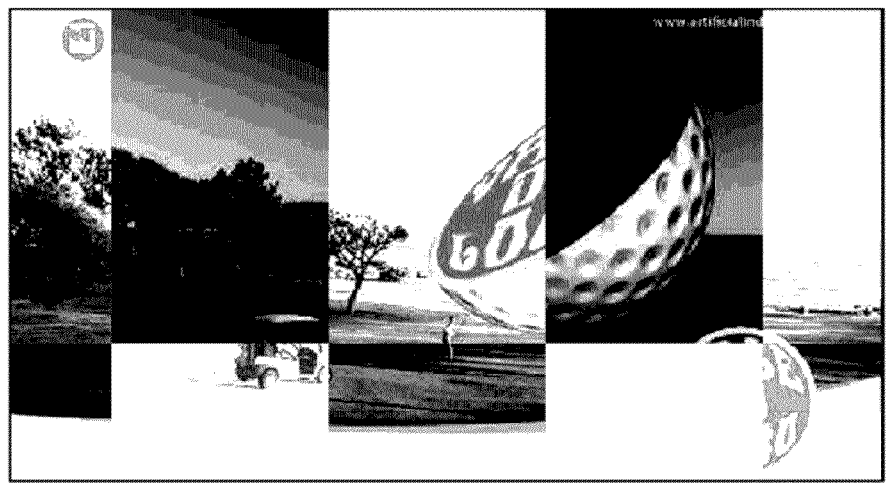
FIG. 6A is an exemplary image displayed with a 2D image signal provided to the display apparatus of FIG. 5.
Figure 6B:
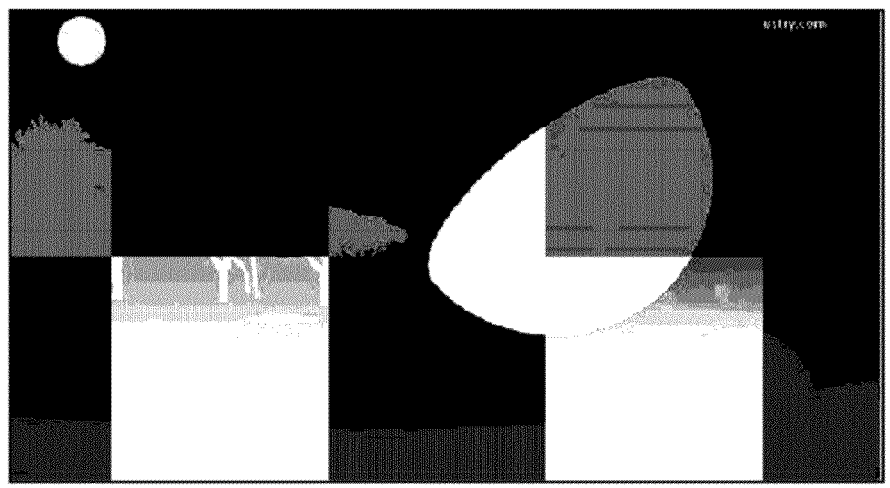
FIG. 6B is an exemplary image displayed with depth data corresponding to the 2D image signal of FIG. 6A.

FIG. 6A is an exemplary image displayed with an image signal provided to the display apparatus of FIG. 5, and FIG. 6B is an exemplary image displayed with depth data corresponding to the image signal of FIG. 6A.

Referring to FIGS. 6A and 6B, the first image signal RGB1 includes 2D image data displayed and depth data that when used together with the 2D image data enables the display of the 3D image. The image of FIG. 6A corresponds to the 2D image data, and the image of FIG. 6B corresponds to the depth data.

Specifically, to three-dimensionally display a half-cut golf ball, the golf ball may be displayed so as to be perceived as protruding outward from the display panel 100 more than a background of the image, e.g., the sky and golf course scene.

In FIG. 6B, depth data corresponding to the golf ball indicates a light grayscale level. On the other hand, in FIG. 6A, the background may be displayed as if disposed behind than the golf ball. Therefore, in FIG. 6B, depth data corresponding to the background indicates a dark grayscale level.

Figure 7:
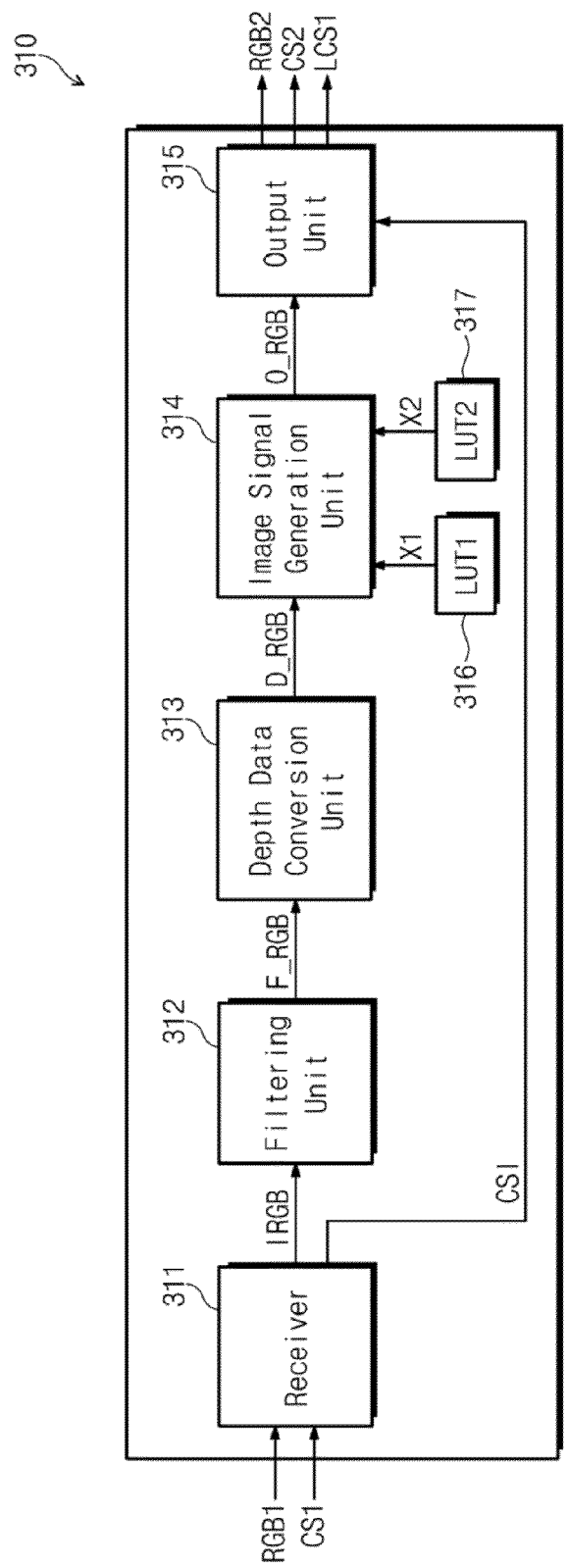
FIG. 7 is a block diagram showing a frame rate converter of FIG. 5.

FIG. 7 is a block diagram showing a frame rate converter of FIG. 5.

Referring to FIG. 7, the frame rate converter 310 may include a receiver 311, a filtering unit 312, a depth data conversion unit 313, an image signal generation unit 314, an output unit 315, a first look-up table 316, and a second look-up table 317. The display panel driving unit 300 may be operated in the time-division driving mode and the normal driving mode. The operation of the frame rate converter 310 will be firstly described in the time-division driving mode.

The receiver 311 receives the first image signal RGB1 and the first control signal CS1 and outputs N-speed sub-image signal IRGB, where N is a positive constant number. According to an exemplary embodiment of the present disclosure, N is 2 in the case of the time-division driving mode and N is 1 in the case of the normal driving mode. It should be understood that that the present disclosure is not limited exemplary embodiments presented herein. In the time-division driving mode, the receiver 311 sequentially outputs the sub-image signal IRGB corresponding to the first sub-frame and the sub-image signal IRGB corresponding to the second sub-frame using one frame of the first image signal RGB1. The first sub-frame and the second sub-frame indicate time periods represented in the sequence. For example, when the first image signal RGB1 has a frequency of about 60 Hz and N is 2, the sub-image signal IRGB has a frequency of about 120 Hz. Therefore, when the first image signal RGB1 has a frequency of about 60 Hz and N is 4, the frequency of the sub-image signal IRGB is about 240 Hz. The receiver 311 applies a control signal CSI to the output unit 315.

During the normal driving mode, the receiver 311 outputs one frame of the first image signal RGB1 as the sub-image signal IRGB without varying the first image signal RGB1.

The filtering unit 312 receives and filters the sub-image signal IRGB to output the filtered image signal F_RGB. The display panel 100 substantially includes a plurality of tetragonal pixels. When the display panel 100 displays a curve, the curve may be displayed as a stair-type boundary line. To remove the stair-type boundary line and display a smooth curve, an anti-aliasing method may be applied to the sub-image signal IRGB. Therefore, the filtered image signal F_RGB denotes a signal that is generated by anti-aliasing the sub-image signal IRGB. The sub-image signal IRGB includes the 2D image data and the depth data, and the filtering unit 312 may apply an anti-aliasing method to at least one of the 2D image data and the depth data.

According to an exemplary embodiment of the present disclosure, the frame rate converter 310 includes the filtering unit 312. It should be understood that that the present disclosure is not limited exemplary embodiments presented herein. For example, in a case where the sub-image signal IRGB has been smoothed by an anti-aliasing method, the frame rate converter 310 may not include the filtering unit 312.

The depth data conversion unit 313 converts depth data (or filtered depth data) of the filtered image signal F_RGB to output a depth-converted image signal D_RGB.

By converting depth data corresponding to the 2D image data supplied to each pixel on the basis of depth data corresponding to the 2D image data supplied to a certain number of pixels adjacent to each pixel, the depth-converted image signal D_RGB is generated.

The image signal generation unit 314 receives the depth-converted image signal D_RGB to output an output sub-image signal O_RGB based on one of the first and second look-up tables 316 and 317. The output sub-image signal O_RGB is converted to a signal enabling the perception of the 3D image on the basis of the depth-converted image signal D_RGB. In other words, the output sub-image signal O_RGB is generated by rendering the 2D image data on the basis of the depth-converted image signal D_RGB. Herein, rendering denotes that 2D image data is converted to 3D image data using depth data.

The output unit 315 receives the output sub-image signal O_RGB and the control signal CSI to output the second image signal RGB2 and the second control signal CS2. The second control signal CS2 may be the same signal as the first control signal CS1, or a signal to which the first control signal CS1 is converted according to the sub-image signal IRGB.

Figure 8A:
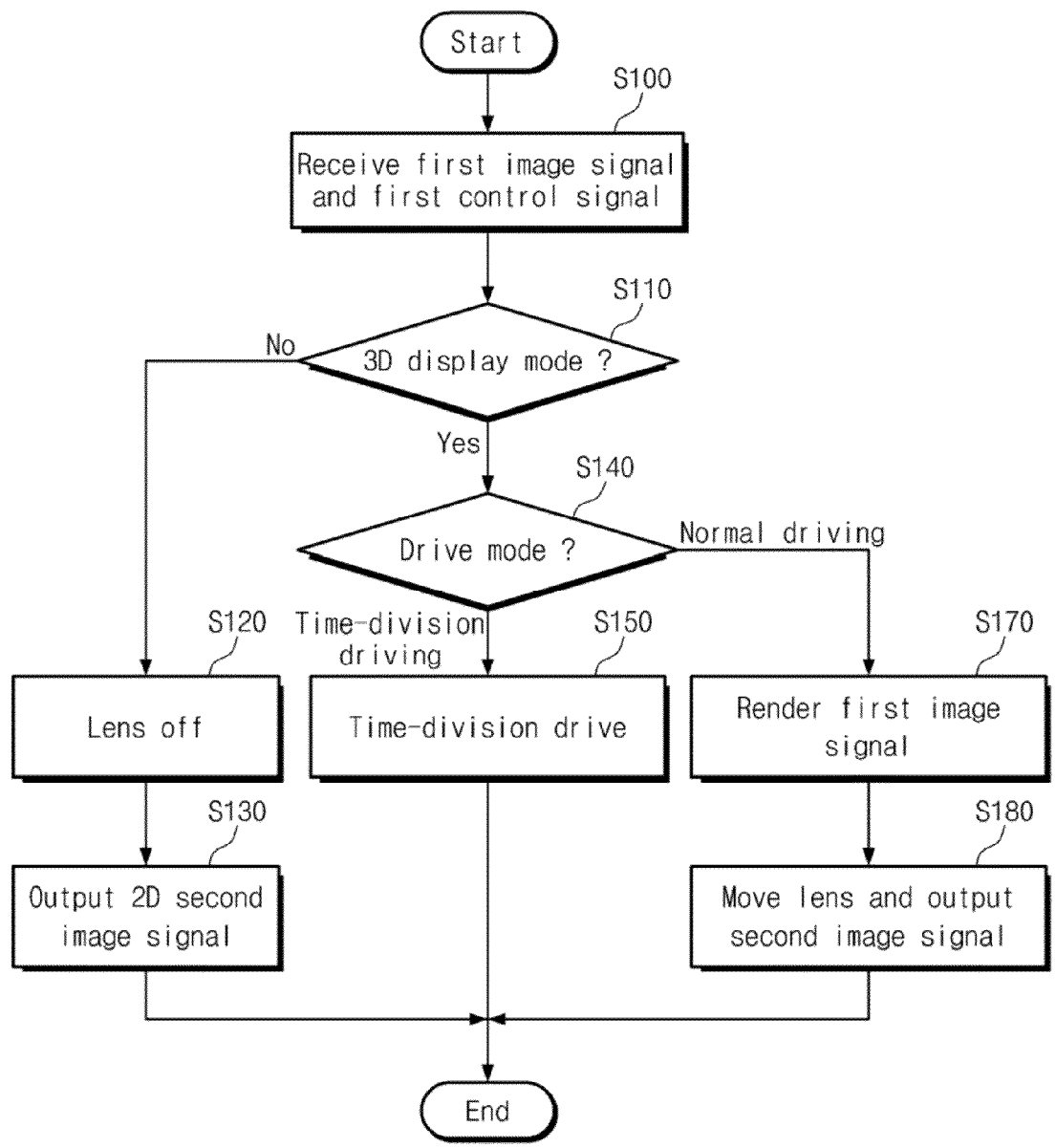
FIGS. 8A and 8B are flowcharts illustrating an operation of the frame rate converter of FIG. 7.
Figure 8B:
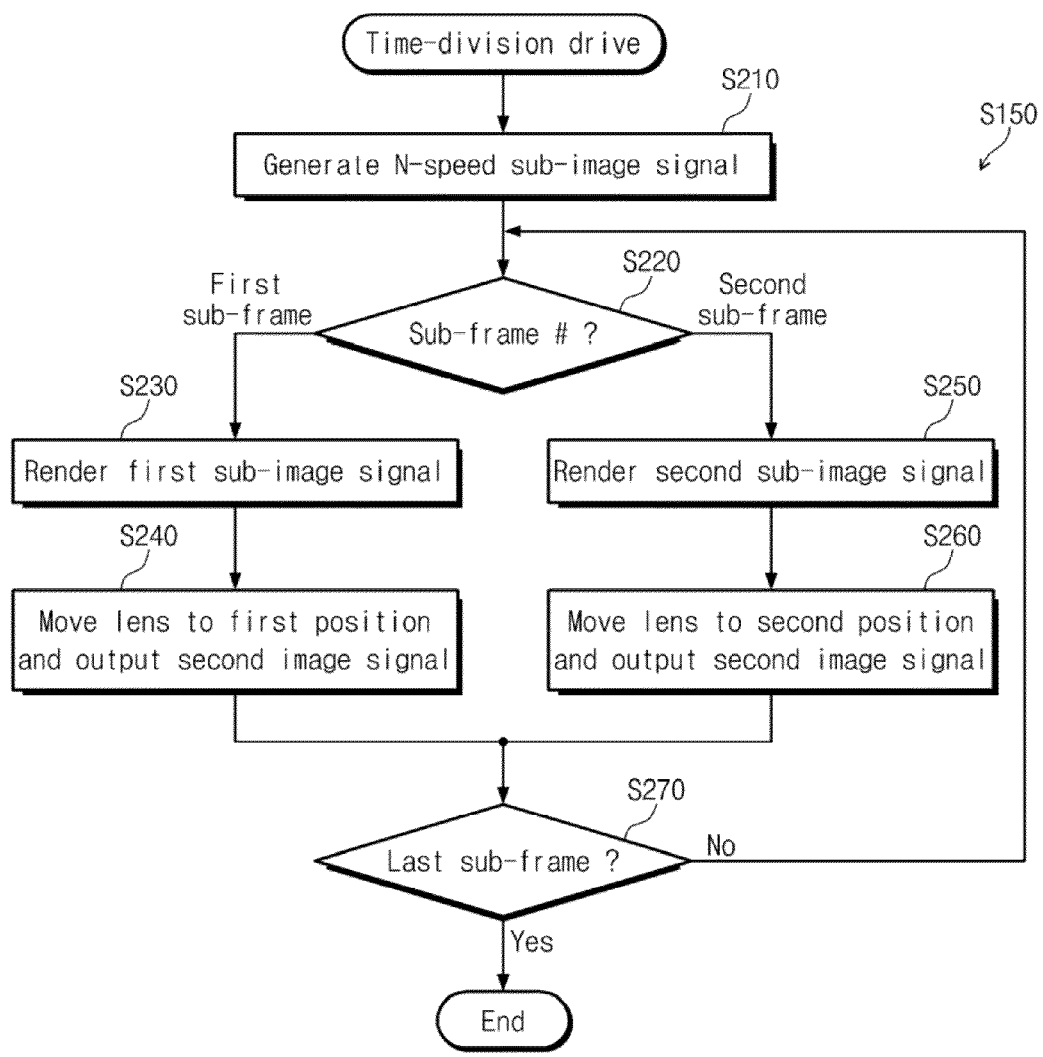

FIGS. 8A and 8B are flowcharts illustrating an exemplary operation of the frame rate converter of FIG. 7.

Referring to FIGS. 7 and 8A, the receiver 311 receives the first image signal RGB1 including the 2D image data and the depth data, and the first control signal CS1 (S100). When a display mode set by a user is a 2D display mode (S110), the lens control signal LCS1 is output to control the lens plate 200 shown in FIG. 1 not to operate (S120). During the 2D display mode, the filtering unit 312, the depth data conversion unit 313, and the image signal generation unit 314 in the frame rate converter 310 output the first image signal RGB1 of the 2D image signal to the output unit 315 without varying the first image signal RGB1. The output unit 315 outputs the second image signal RGB2 and the second control signal CS2 (S130).

When the display mode set by the user is a 3D display mode (S110), the frame rate converter 310 checks whether the 3D display mode is the time-division driving mode or the normal driving mode (S140). When the 3D display mode is the time-division driving mode, the control of the frame rate converter 310 proceeds to block 5150, and when the 3D display mode is the normal driving mode, the control of the frame rate converter 310 proceeds to block S170.

During the normal driving mode, the frame rate converter 310 performs rendering of the first image signal RGB1 (S170). The frame rate converter 310 outputs the lens control signal LCS1 to control the lens driving unit 400 shown in FIG. 1, thereby displaying eight viewpoints substantially simultaneously. In addition, the output unit 315 of the frame rate converter 310 outputs the second image signal RGB2 and the second control signal CS2, which correspond to the eight viewpoints (S180).

The operation of the frame rate converter 310 in the case of the time-division driving mode is shown in FIG. 8B.

Referring to FIGS. 7 and 8B, the receiver 311 outputs the first image signal TGB1 of one frame as the N-speed sub-image signal IRGB (S210). As described herein, the receiver 311 sequentially outputs the sub-image signal IRGB corresponding to the first sub-frame and the sub-image signal IRGB corresponding to the second sub-frame for each frame of the first image signal RGB1.

When the receiver 311 sequentially outputs the sub-image signal IRGB corresponding to the first sub-frame and the sub-image signal IRGB corresponding to the second sub-frame for each frame of the first image signal RGB1, the sub-image signal IRGB corresponding to the first sub-frame is referred to as a first sub-image signal IRGB1 and the sub-image signal IRGB corresponding to the second sub-frame is referred to as a second sub-image signal IRGB2.

When a current sub-frame is the first sub-frame (S220), the filtering unit 312, the depth data conversion unit 313, and the image signal generation unit 314 shown in FIG. 7 perform rendering of the first sub-image signal IRGB1 (S230). The output unit 315 outputs the rendered output sub-image signal O_RGB as the second image signal RGB2 and outputs the second control signal CS2 and the lens control signal LCS1 (S240). In this case, the lens control signal LCS1 is used to shift the lens plate 200 shown in FIG. 1 to the first position.

When the current sub-frame is the second sub-frame (S220), the filtering unit 312, the depth data conversion unit 313, and the image signal generation unit 314 shown in FIG. 7 perform rendering of the second sub-image signal IRGB2 (S250). The output unit 315 outputs the rendered output sub-image signal O_RGB as the second image signal RGB2 and outputs the second control signal CS2 and the lens control signal LCS1 (S260). In this case, the lens control signal LCS1 is used to shift the lens plate 200 shown in FIG. 1 to the second position.

After the lens plate 200 is shifted to the first position or the second position, the timing controller 320 shown in FIG. 5 controls the display panel 100 in response to the second image signal RGB2 and the second control signal CS2 from the frame rate converter 310 so as to allow the images of the first and second sub-frames to be sequentially displayed.

Referring to FIGS. 7 and 8B, the receiver 311 determines whether a last sub-frame of the first image signal RGB1 has been rendered (S270). For example, in the case that a frame of the first image signal RGB1 is converted into two sub-image signals, the control of the frame rate converter 310 returns to block S220 such that the rendering (S250) of the second sub-image signal IRGB2 and the output (S260) of the second image signal RGB2 are performed after completing the rendering (S230) of the first sub-image signal IRGB1 and the output (S240) of the second image signal RGB2.

When the rendering (S250) of the second sub-image signal IRGB2 of the second sub-frame that is the last sub-frame and the output (S260) of the second image signal RGB2 is completed, the frame rate conversion operation of the frame of the first image signal RGB1 is finished (S270).

Figure 9:
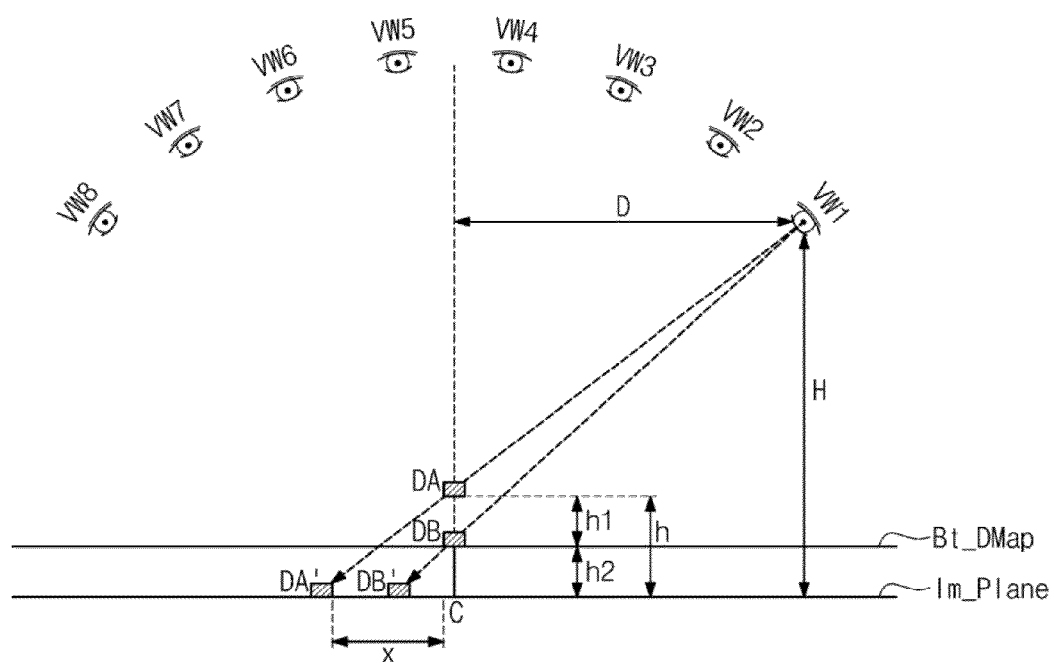
FIG. 9 is a diagram illustrating a method of generating a second image signal of an image having multi-viewpoints with 2D image data and depth data included in a first image signal applied to the frame rate converter of FIG. 7.

FIG. 9 is a diagram illustrating a method of generating a second image signal of an image having multiple viewpoints with 2D image data and depth data included in a first image signal applied to the frame rate converter of FIG. 7.

Referring to FIG. 9, a display plane Im_Plane of the display apparatus and a bottom level Bt_DMap (e.g., a zero grayscale level) of the depth data are indicated as lines. According to FIG. 9, an image having eight viewpoints VW1 to VW8 may be generated using the 2D image data and the depth data. The image having the eight viewpoints VW1 to VW8 may be displayed to the viewer by using a lenticular lens or a liquid crystal lens that is included in the display apparatus.

The first viewpoint VW1 is disposed at the rightmost side when viewed from the display apparatus, and the second to eighth viewpoints VW2 to VW8 are disposed leftward from the first viewpoint VW1. The eighth viewpoint VW8 is disposed at the leftmost side when viewed from the display apparatus.

In FIG. 9, first data DA and second data DB are disposed at a center C of the display plane Im_Plane. Depth data corresponding to the first data DA has an h1 grayscale level, and depth data corresponding to the second data DB has a zero grayscale level. Therefore, the second data DB is displayed at the zero grayscale level, and the first data DA is displayed in front of the display apparatus by the h grayscale level.

When viewed from the first viewpoint VW1, the first data DA is displayed as first 3D data DA' on the display plane Im_plane, and the second data DB is displayed as second 3D data DB' on the display plane Im_Plane. In other words, when viewed from the first viewpoint VW1, the first data DA is moved to leftward from the second data DB and displayed. On the other hand, when viewed from the eighth viewpoint VW8, the first data DA is moved to rightward from the second data DB and displayed. In view of the foregoing, the first data DA of the first to fourth viewpoints VW1 to VW4 are moved to leftward from the second data DB and displayed, and the first data DA of the fifth to eighth viewpoints VW5 to VW8 are moved to rightward from the second data DB and displayed.

In this way, the second image signal RGB2 including an image having a plurality of viewpoints may be generated with the 2D image data and the depth data. In FIG. 9, a positional relationship between the display plane Im_Plane and the bottom level Bt_DMap of the depth data is arbitrarily illustrated. For example, a line indicating the bottom level Bt_DMap of the depth data may be matched with a line indicating the display plane Im_Plane.

According to an exemplary embodiment of the present disclosure, the display apparatus is operated in the time-division driving mode. Therefore, the second image signal RGB2 of the first, third, fifth, and seventh viewpoints VW1, VW3, VW5, and VW7 are displayed on the display apparatus during the first sub-frame, and the second image signal rGB2 of the second, fourth, sixth, and eighth viewpoints VW2, VW4, VW6, and VW8 are displayed on the display apparatus during the second sub-frame.

A distance that the data moved may be measured as follows. A distance between the first data DA of the first viewpoint VW1 and the first 3D data DA' is shown as "x" in FIG. 9. Elsewhere in FIG. 9, a distance between the first viewpoint VW1 and a line crossing the center C of the display plane Im_Plane and vertical to the display plane Im_Plane is shown as "D", a height between the display plane Im_Plane and the first data DA is shown as "h", and a height between the display plane Im_Plane and the first viewpoint VW1 is shown as "H". The distance x indicates the distance between the first data DA and the first 3D data DA' and may be determined according to equation 1.

$$x:x+D=h:H$$

$$x=(h \times D)/(H-h) \qquad \text{Equation 1}$$

The height h between the display plane Im_Plane and the first data DA is h1+h2, and the height h2 is between the display plane Im_Plane and the bottom level Bt_DMap is fixed to h2. Thus, the moving distance x may be determined by the height between the bottom level Bt_DMap and the first data DA, i.e., the grayscale level h1 of the first data DA.

The distance x between the first data DA and the first 3D data DA' corresponds to a distance (x') of the unit of pixel, i.e., a number of the pixels. Information of the distance x' of the unit of pixel between the first data DA and the first 3D data DA' at each of the first to eighth viewpoints VW1 to VW8 are stored in the first and second look-up tables 316 and 317 shown in FIG. 7. More particularly, the first look-up table 316 may store information of a moving distance X1 used to convert the image data into the 3D data at each of the first, third, fifth, and seventh viewpoints VW1, VW3, VW5, and VW7 in the first sub-frame, and the second look-up table 317 may store information of a moving distance X2 used to convert the image data into the 3D data at each of the second, fourth, sixth, and eighth viewpoints VW2, VW4, VW6, and VW8 in the second sub-frame. Each of the first and second look-up tables 316 and 317 may be configured to include a memory.

The image signal generation unit 314 reads out the moving distance information X1 from the first look-up table 316 according to the depth data h1 and the viewpoint during the first sub-frame and reads out the moving distance information X2 from the second look-up table 317 according to the depth data h1 and the viewpoint during the second sub-frame.

As described with reference to FIGS. 4A and 4B, the look-up tables are respectively used for the first and second sub-frames, which are different from each other, because the position of the lens is changed in each of the first and second sub-frames by the lens plate 200. According to the movement of the lens, the moving distance information X1 according to the depth data h1 and the viewpoint during the first sub-frame has a value different from that of the moving distance information X2 according to the depth data h1 and the viewpoint during the second sub-frame.

According to an exemplary embodiment of the present disclosure, the look-up tables 316 and 317 are configured to include different memories, respectively, or configured to share a single memory. In each case, the moving distance information X1 according to the depth data h1 and the viewpoint during the first sub-frame has a value different from that of the moving distance information X2 according to the depth data h1 and the viewpoint during the second sub-frame.

Figure 10A:
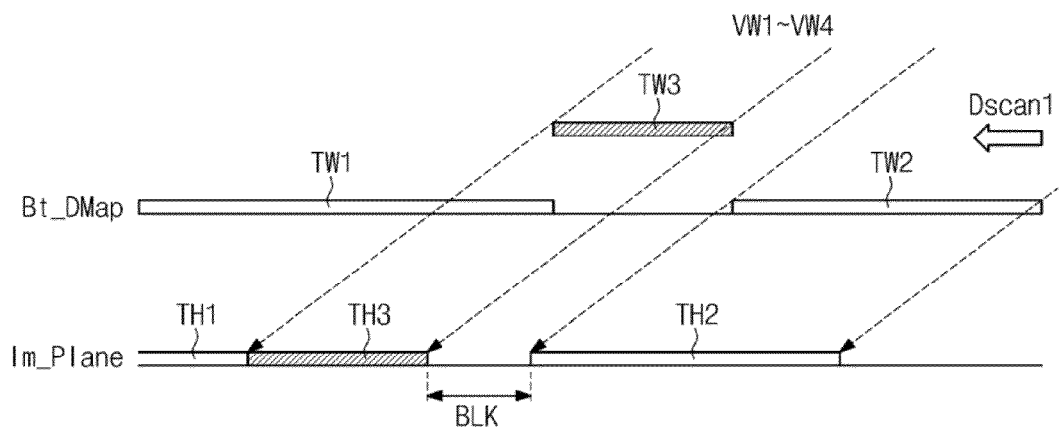
FIG. 10A is a diagram specifically describing a rendering method at any one of first to fourth viewpoints in FIG. 9.
Figure 10B:
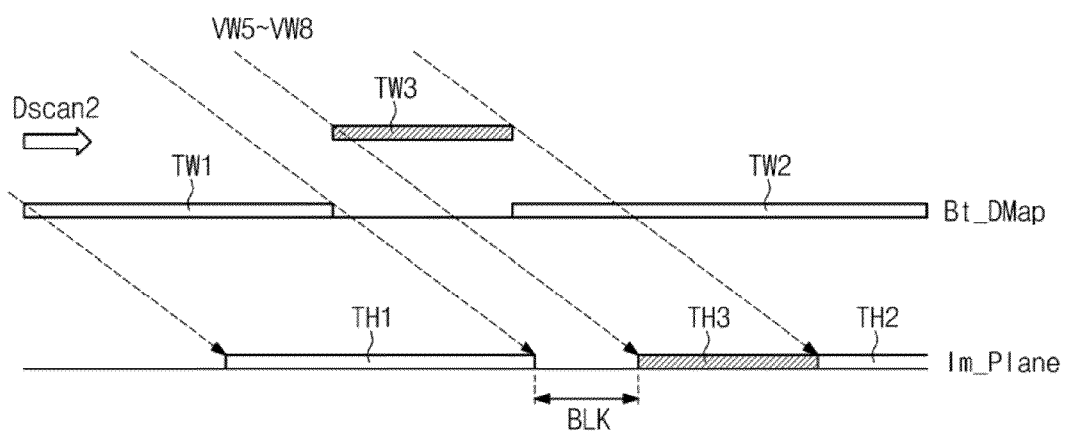
FIG. 10B is a diagram specifically describing a rendering method at any one of fifth to eighth viewpoints in FIG. 9.

FIG. 10A is a diagram illustrating a rendering method at any one of first to fourth viewpoints in FIG. 9, and FIG. 10B is a diagram illustrating a rendering method at any one of fifth to eighth viewpoints in FIG. 9.

Referring to FIG. 10A, depth data are illustrated as first and second data TW1 and TW2 having a zero grayscale level, and depth data is illustrated as third data TW3 having a grayscale level other than zero. When the first to third data TW1 to TW3 are rendered in a direction Dscan1 traveling from the right to the left, when viewed from any one of first to fourth viewpoints VW1 to VW4, the first to third data TW1 to TW3 are moved leftward on the display plane Im_plane and converted into first to third 3D data TH1 to TH3 to display a 3D image corresponding to the first to third data TW1 to TW3. In particular, the third data TW3 having a grayscale level other than zero is moved leftward more than the first and second data TW1 and TW2 and converted into the third 3D data TH3.

As illustrated in FIG. 10A, as the third data TW3 is converted into the 3D data TH3, moving to a new position, and displayed, a portion of the first data TW1 is not displayed in a stereoscopic image. Also, as the first to third data TW1 to TW3 are converted into the first to third 3D data TH1 to TH3, moving to a new position, and displayed, a blank data section BLK is formed at pixels for which no data has been input in a portion of the display plane Im_Plane.

Referring to FIG. 10B, depth data including first and second data TW1 and TW2 have a zero grayscale level, and depth data including third data TW3 has a grayscale level other than zero. When the first to third data TW1 to TW3 are rendered in a direction Dscan2 traveling from the left to the right, when viewed from any one of fifth to eighth viewpoints VW5 to VW8, the first to third data TW1 to TW3 are required to be moved rightward on the display plane Im_Plane and converted to first to third 3D data TH1 to TH3 in order to three-dimensionally display the first to third data TW1 to TW3. Particularly, the third data TW3 having a grayscale level other than zero is moved rightward more than the first and second data TW1 and TW2 and converted to the third 3D data TH3.

As illustrated in FIG. 10B, as the third data TW3 is switched to the third 3D data TH3 in position and displayed, a portion of the second data TW2 is not displayed in a stereoscopic image. Also, as the first to third data TW1 to TW3 are switched in position and displayed, a blank data section BLK is formed at pixels for which no data has been input in a portion of the display plane Im_Plane.

In FIGS. 10A and 10B, the blank data section BLK corresponds to a black image portion. Therefore, data may be generated on the basis of data corresponding to pixels adjacent to the pixels of the blank data section BLK and supplied to the pixels of the blank data section BLK in a hole filling method. A detailed description of a hole filling method will be made herein with reference to the accompanying drawings.

Figure 11:
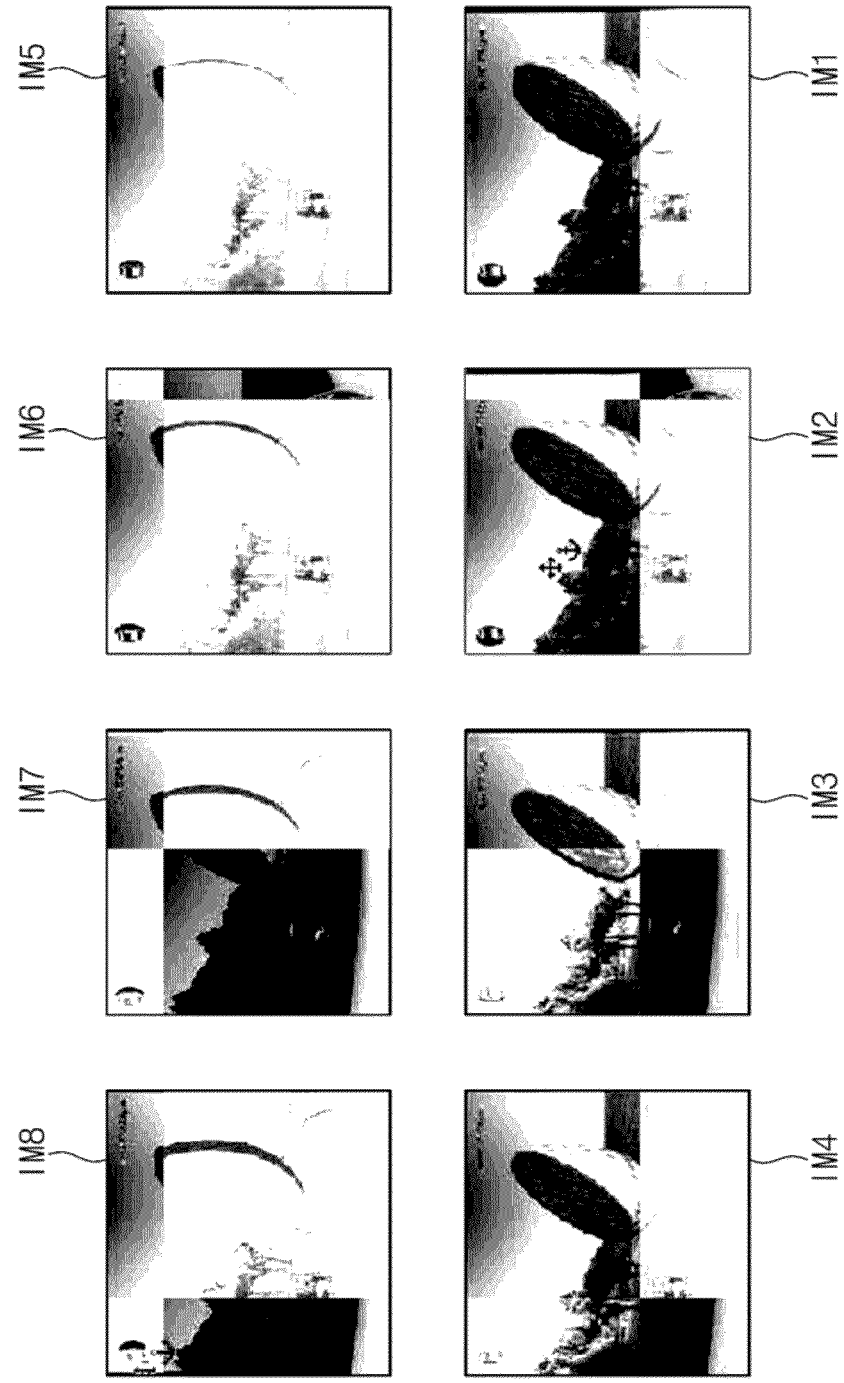
FIG. 11 are images showing eight viewpoints, respectively, which are generated by rendering the 2D image signal of FIG. 6A with the depth data of FIG. 6B.

FIG. 11 are diagrams showing respective images for eight viewpoints which are generated by rendering the 2D image signal of FIG. 6A with the depth data of FIG. 6B.

Referring to FIG. 11, first, second, third, fourth, fifth, sixth, seventh, and eighth images IM1, IM2, IM3, IM4, IM5, IM6, IM7, and IM8 are images displayed at the first to eighth viewpoints VW1 to VW8 shown in FIG. 9, respectively. Since the display apparatus displays the respective images IM1 to IM8 for the eight viewpoints, the viewer may perceive an image in three-dimensions. For purposes of clarity, the first to eighth images IM1 to IM8 are sequentially illustrated from left to right on the display apparatus, corresponding to the eighth viewpoints VW1 to VW8 shown in FIG. 9.

In the eighth image IM8 corresponding to the eighth viewpoint VW8 or the first image IM1 corresponding to the first viewpoint VW1, it can be seen that a half-cut golf ball is moved left or right relative to the background. In addition, the movement of the half-cut golf ball is the greatest in the first image IM1 and the eighth image IM8.

Moreover, as the half-cut golf ball is moved left or right and displayed, it can be seen that a black image is displayed in a portion of a region in which the half-cut golf ball was disposed originally. The black image corresponds to the blank data section BLK of FIG. 10A or FIG. 10B, at pixels in the blank data section BLK where a data voltage is not applied.

Figure 12:
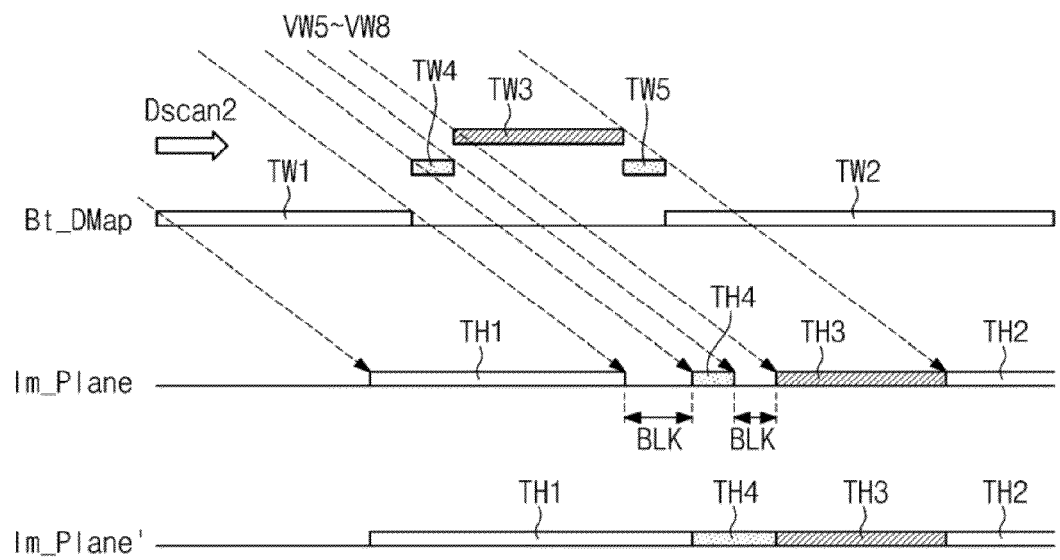
FIG. 12 is a diagram showing anti-aliased depth data.

FIG. 12 is a diagram showing anti-aliased depth data.

Referring to FIG. 12, depth data having a zero grayscale level are illustrated as first and second data TW1 and TW2, depth data having a grayscale level other than zero is illustrated as third data TW3, and depth data illustrated as fourth and fifth data TW4 and TW5 each have a grayscale level greater than a zero grayscale level and lower than the grayscale level of the third data TW3.

The filtering unit 312 shown in FIG. 7 performs the anti-aliasing process on the sub-image data IRGB output from the receiver 311. The fourth and fifth data TW4 and TW5 of FIG. 12 correspond to data generated through an anti-aliasing processing of the first to third data TW1 to TW3.

In FIG. 12, when 3D image data is generated by rendering the first to fifth data TW1 to TW5 with respect to the fifth to eighth viewpoints VW5 to VW8, the first to fifth data TW1 to TW5 are respectively converted to first to fifth 3D data TH1 to TH5. As illustrated in FIG. 12, when rendering the first to fifth data TW1 to TW5 with respect to the fifth to eighth viewpoints VW5 to VW8, a blank data section BLK is formed between the first 3D data TH1 and the fourth 3D data TH4 and between the third 3D data TH3 and the fourth 3D data TH4.

A hole filling method may be used to substantially prevent the blank data section BLK from being displayed as a black image portion. FIG. 12 illustrates an exemplary hole filling processing that fills the blank data section BLK with data copied from data input to an adjacent pixel, e.g., from a pixel to the left of a pixel of the blank data section BLK. In a modified display plane Im_plane', the data of the blank data sections BLK are sequentially filled in a direction Dscan2 in which the rendering is performed, wherein the data of the blank data sections BLK is generated or copied from data of an adjacent pixel to the left thereof. Such a hole filling method may substantially prevent the black image portion corresponding to the blank data section BLK from being displayed.

Figure 13A:
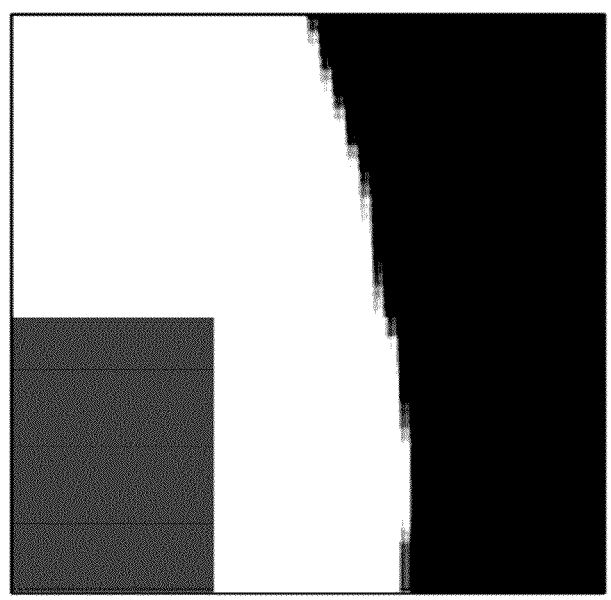
FIG. 13A is an enlarged portion of depth data of FIG. 6B rendered using an anti-aliasing method.
Figure 13B:
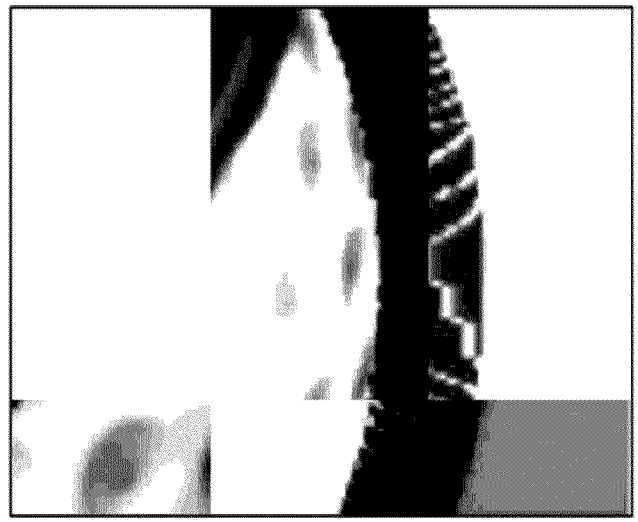
FIG. 13B is an enlarged portion of the image of the 2D image data of FIG. 6A using the anti-aliased data of FIG. 13A.
Figure 13C:
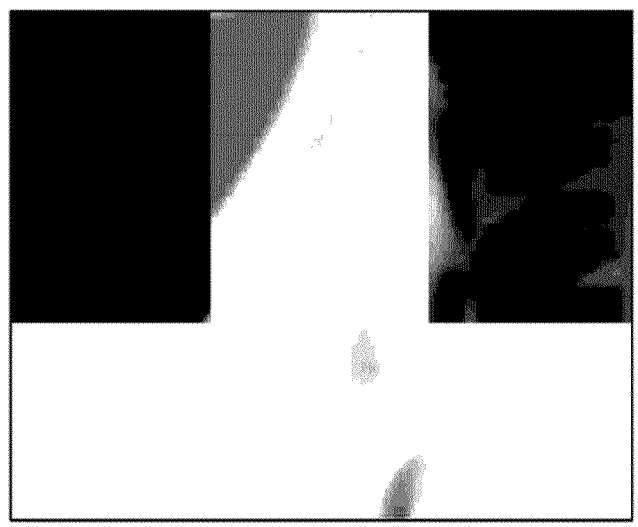
FIG. 13C is an image obtained by processing 3D image data of FIG. 13B in a hole filling method.

FIG. 13A shows an enlarged portion of the image of FIG. 6B, with anti-aliasing processing, FIG. 13B shows an enlarged portion of the 2D image data of FIG. 6A, together with the anti-aliased data of FIG. 13A, and FIG. 13C is an image obtained by processing 3D image data of FIG. 13B using a hole filling method.

Referring to FIGS. 6B and 13A, in the depth data of FIG. 6B, when a boundary between a relatively higher grayscale level region (e.g., a half-cut golf ball region) and a relatively lower grayscale level region (e.g., a sky or ground region) is displayed as a curve, the depth data is anti-aliased so as to prevent a stair-type boundary line from being visible due to tetragonal pixels. Thus, in FIG. 13A, a grayscale level of the boundary portion is gradually changed.

Referring to FIGS. 6A and 13B, when the 3D image data is generated by rendering the 2D image data of FIG. 6A with the anti-aliased depth data of FIG. 13A, a striped black image is generated in correspondence with the anti-aliased data and the blank data. That is, in FIG. 13B, a black rim shape is displayed on a half-cut golf ball.

Referring to FIGS. 12 and 13C, when the 3D image data is processed using the hole filling method of FIG. 12, a portion where the black image may be displayed as shown in FIG. 13B is removed and an image such as FIG. 13C may be obtained. By such a method, the black image portion may be removed.

Lines such as a wave pattern are extended and displayed on the rim of the half-cut golf ball of FIG. 13C, where the wave pattern may be caused by filling the pixels corresponding to the blank data section BLK using data generated or copied from data input to adjacent pixels. In this way, a pattern such as the wave pattern, referred to as tailing, may be formed by the hole filling method. The occurrence of the tailing may degrade the display quality of the 3D stereoscopic image.

Figure 14:
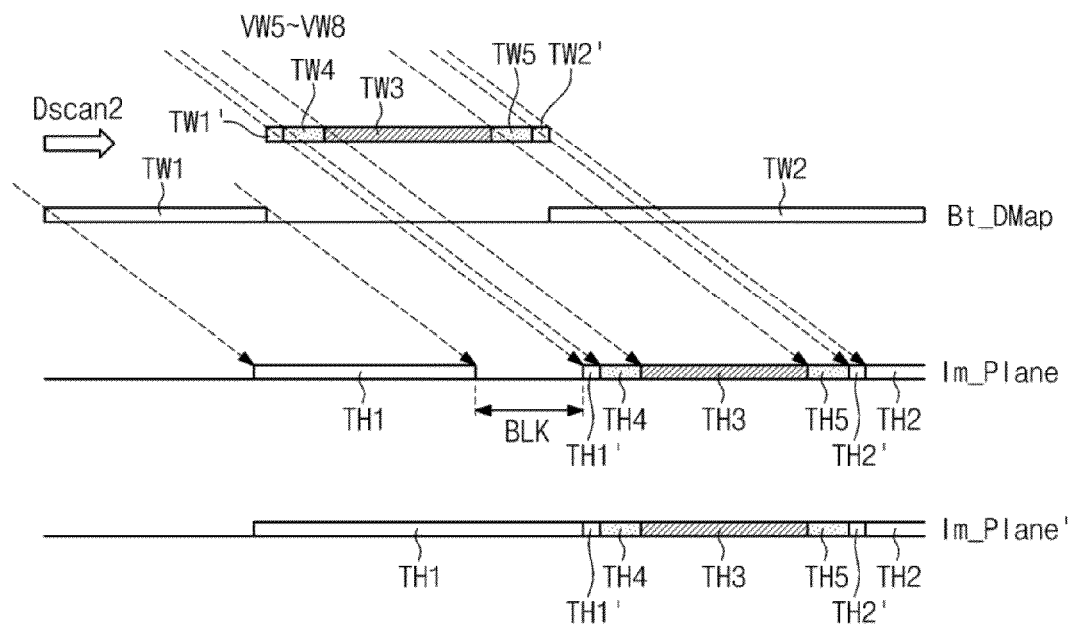
FIG. 14 is a diagram showing a depth data processing method according to an exemplary embodiment of the present invention.

FIG. 14 is a diagram showing a depth data processing method according to an exemplary embodiment of the present invention.

FIG. 14 shows converted depth data generated by filtering the depth data of FIG. 12 for substantially preventing the occurrence of the tailing of FIG. 13C. The depth data processing method of FIG. 14 will be described below.

To substantially prevent tailing from occurring as a result of anti-aliasing depth data, in FIG. 14, the depth data may be converted using a max filtering method to depth data having a highest value among a number of adjacent data. It should be understood that other methods of converting the depth data may be implemented and that the present disclosure is not limited to the max filtering method.

Specifically, the depth data corresponding to the 2D image data supplied to the current pixel CP may be converted to data having the highest value among the depth data corresponding to the 2D image data supplied to pixels, e.g., 26 pixels, adjacent to the current pixel CP.

Referring to Table 1 below, a pixel group of three rows by nine columns with reference to the current pixel CP are set, and depth data having the highest value among depth data that respectively correspond to 2D image data supplied to 26 pixels included in the pixel group may be converted to depth data corresponding to 2D image data of the current pixel CP.

In Table 1, 26 pixels adjacent to the current pixel CP are listed as an example. For example, four pixels disposed adjacent to the left of the current pixel CP are respectively indicated as LC1 to LC4, and four pixels disposed adjacent to the right of the current pixel CP are respectively indicated as RC1 to RC4. Further, the nine pixels disposed adjacent to the top of the current pixel CP are indicated as, for example, LU1, where U indicates upper pixels. Similarly, the nine pixels disposed adjacent to the bottom of the current pixel CP are indicated as, for example, LL1, where L indicates lower pixels.

A pixel group in Table 1 is provided as an example, and the number of pixels included in the pixel group and a method of setting the pixel group may be changed according to embodiments.

TABLE 1

| LU1 | LU2 | LU3 | LU4 | CU1 | RU4 | RU3 | RU2 | RU1 |
| LC1 | LC2 | LC3 | LC4 | CP  | RC4 | RC3 | RC2 | RC1 |
| LL1 | LL2 | LL3 | LL4 | CL1 | RL4 | RL3 | RL2 | RL1 |

In detail, when depth data are converted through the method of Table 1, as illustrated in FIG. 14, depth data of fourth and fifth data TW4 and TW5 that are generated through the anti-aliasing method and portions TW1' and TW2' of first and second data TW1 and TW2 have the same grayscale level as that of depth data of third data TW3.

When first to fifth data TW1 to TW5 of the 3D image data are rendered on the basis of the converted depth data of FIG. 14, the first to fifth data TW1 to TW5 are respectively converted to first to fifth data TH1 to TH5 in a display plane Im_Plane. When data indicated in the display plane Im_Plane are processed through the hole filtering method, the data is converted to data illustrated in a modified display plane Im_Plane'.

When comparing data respectively indicated in the modified display plane Im_Plane' in FIGS. 12 and 14 with each other, the width of the fourth 3D data TH4 of the modified display plane Im_Plane' becomes narrow as shown in FIG. 14. Accordingly, tailing that occurs in a boundary between the first 3D data TH1 and the third 3D data TH3 may be decreased.

Figure 15:
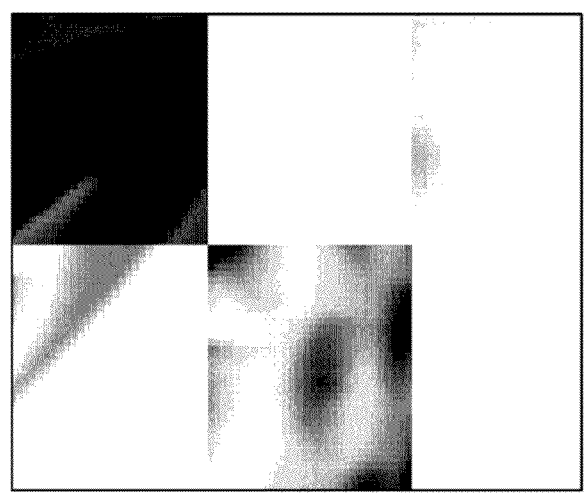
FIG. 15 is an image showing that depth data of FIG. 13A has been converted by a max filtering method, and 2D image data of FIG. 6A is converted to 3D image data with the converted depth data.

FIG. 15 is an image showing depth data of FIG. 13A converted by a max filtering method, and 2D image data of FIG. 6A converted to 3D image data with the converted depth data.

When comparing FIGS. 13C and 15, the tailing appearing in FIG. 13C has been substantially removed from the image of FIG. 15.

Figure 16A:
FIGS. 16A and 16B show different images generated with depth data that is obtained by converting depth data in the max filtering method.
Figure 16B:
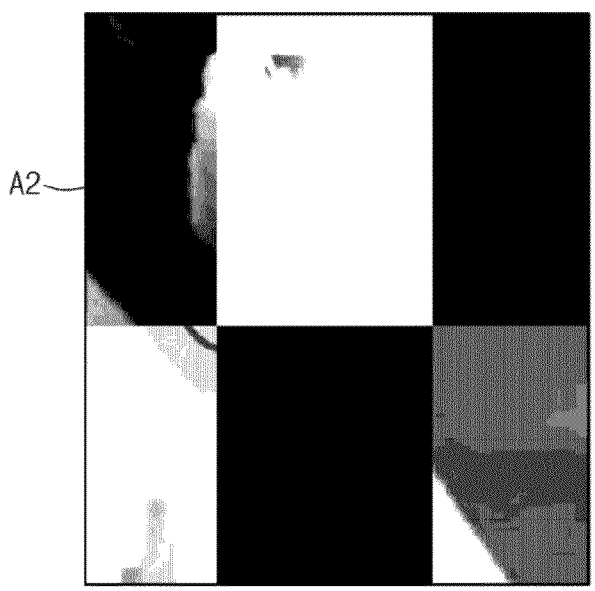

FIGS. 16A and 16B are images respectively showing different images generated with depth data that is obtained by converting depth data by the max filtering method.

Referring again to FIG. 14, in the display plane Im_Plane, the portion TW2' of the second data and the fifth data TW5 have the same level as a grayscale level of the depth data of the third data TW3, and thus, the portion TW2' of the second data and the fifth data TW5 are respectively rendered to a portion TH2' of the second 2D data TH2 and the fifth data TH5 in a position adjacent to the right of the third 3D data TH3. Thus, the portion TW2' of the second data and the fifth data TW5 forms a frame of the third data TH3.

As shown in FIG. 16A, a frame of Pinocchio's nose is relatively thicker in a region A1 near the Pinocchio's nose. As shown in FIG. 16B, also, a frame of a light colored object is relatively thicker in a left region of the light colored object, namely, in a region A2. As shown in FIGS. 16A and 16B, when a frame of an object is displayed thickly, the display quality of a 3D stereoscopic image may be degraded.

Figure 17:
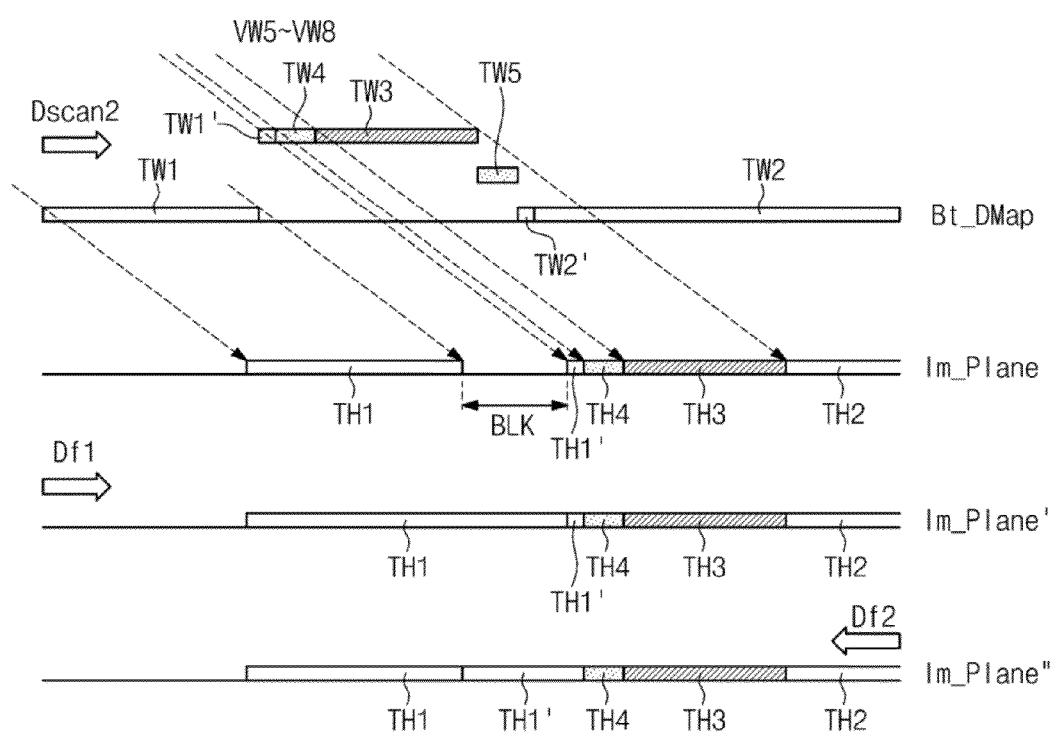
FIG. 17 is a diagram showing a depth data processing method according to another exemplary embodiment of the present invention.

FIG. 17 is a diagram showing a depth data processing method according to another exemplary embodiment of the present invention.

FIG. 17 shows converted depth data that is generated by filtering the depth data of FIG. 12 to substantially prevent the occurrence of the tailing in FIG. 13C and a case where a frame of an object is thickly displayed as in FIGS. 16A and 16B. The depth data processing method of FIG. 17 will be described as follows.

In FIG. 17, depth data may be converted to depth data having the highest value among a number of adjacent data. Unlike in FIG. 14, the range of the adjacent data is determined differently in FIG. 17.

In detail, Table 2 below represents a max filtering method that is applied to depth data when generating 3D image data for one of first to fourth viewpoints VW1-VW4, and Table 3 below represents a max filtering method that may be applied to the depth data when generating 3D image data for one of fifth to eighth viewpoints VW5-VW8.

Referring to Tables 2 and 3, depth data corresponding to 2D image data supplied to a current pixel CP may be converted to data having the highest value among depth data corresponding to 2D image data supplied to pixels, e.g., 14 pixels, adjacent to the current pixel CP.

In more detail, referring to Table 2, a pixel group, which includes pixels arranged in three rows by five columns together with the current pixel CP, is set, depth data having the highest value among depth data that respectively correspond to 2D image data supplied to pixels included in the three row, five column pixel group may be converted to depth data corresponding to 2D depth data supplied to the current pixel CP.

In Table 2, 14 pixels adjacent to the current pixel CP are listed as an example. For example, four pixels disposed adjacent to the left of the current pixel CP are respectively indicated as LC1 to LC4, four pixels disposed above the pixels LC1 to LC4 are respectively indicated as LU1 to LU4, four pixels disposed below the pixels LC1 to LC4 are respectively indicated as LL1 to LL4, a pixel disposed above the current pixel CP is indicated as CU1, and a pixel disposed below the current pixel CP is indicated as CL1. Pixels adjacent to the right of the current pixel CP are not included in the pixel group including the pixels arranged in three rows by five columns as shown in Table 2.

Referring to Table 3, a pixel group, which includes pixels arranged in three rows by five columns together with the current pixel CP, is set, depth data having the highest value among depth data that respectively correspond to 2D image data supplied to pixels included in the three row, five column pixel group may be converted to depth data corresponding to 2D depth data supplied to the current pixel CP.

In Table 3, 14 pixels adjacent to the current pixel CP are listed as an example. For example, four pixels disposed adjacent to the right of the current pixel CP are respectively indicated as RC1 to RC4, four pixels disposed above the pixels RC1 to RC4 are respectively indicated as RU1 to RU4, four pixels disposed below the pixels RC1 to RC4 are respectively indicated as RL1 to RL4, a pixel disposed above the current pixel CP is indicated as CU1, and a pixel disposed below the current pixel CP is indicated as CL1. Pixels adjacent to the left of the current pixel CP are not included in the pixel group including the pixels arranged in three rows by five columns.

TABLE 2

| LU1 | LU2 | LU3 | LU4 | CU1 |
|-----|-----|-----|-----|-----|
| LC1 | LC2 | LC3 | LC4 | CP  |
| LL1 | LL2 | LL3 | LL4 | CL1 |

TABLE 3

| CU1 | RU4 | RU3 | RU2 | RU1 |
|-----|-----|-----|-----|-----|
| CP  | RC4 | RC3 | RC2 | RC1 |
| CL1 | RL4 | RL3 | RL2 | RL1 |

FIG. 17 shows a rendering method in one of the fifth to eighth viewpoints VW5 to VW8, and thus shows a method that converts depth data in the max filtering method of Table 3.

Referring to FIG. 17 and Table 3, depth data of each data is affected by depth data of data disposed to the right of each data, and thus, depth data of fourth data TW4 is affected by depth data of third data TW3 disposed to the right of the fourth data TW4. Thus, the fourth data TW4 may have the same level as a grayscale level of depth data of third data TW3. However, since depth data of fifth data TW5 is affected by second data TW2 disposed to the right of the fifth data TW5 and depth data of second data TW2 disposed to the right of the fifth data TW5 has a value lower than the depth data of the fifth data TW5, the depth data of the fifth data TW5 maintains its original value. Accordingly, when converting the depth data of FIG. 12 using the max filtering method of Table 3, depth data as shown in FIG. 17 may be obtained.

When 2D image data is converted to 3D image data with the converted depth data of FIG. 17, the fifth data TW5 generated through anti-aliasing is not displayed on a display plane Im_Plane, thereby substantially preventing display quality from being degraded as the result of the anti-aliasing process.

Figure 18:
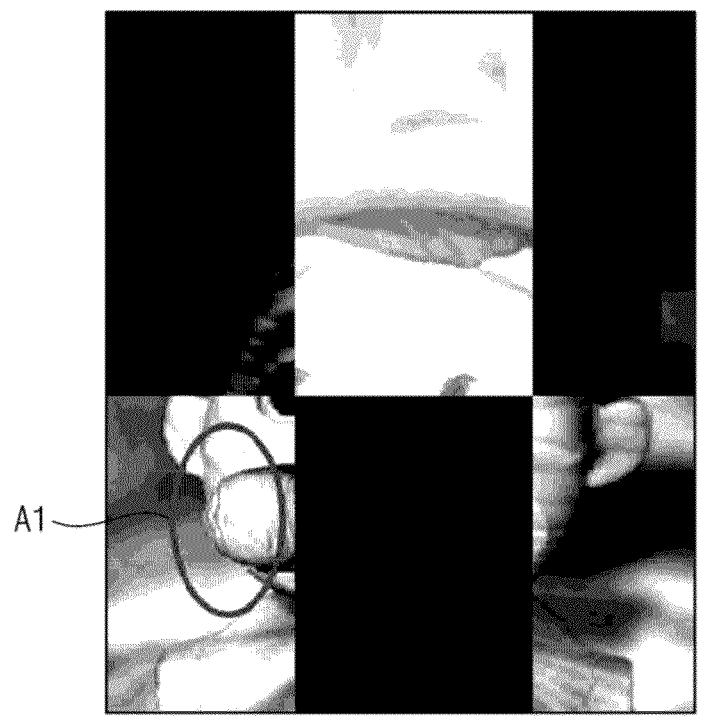
FIG. 18 is an image generated by rendering an image of FIG. 16A with the depth data of FIG. 17.

FIG. 18 is an image generated by rendering an image of FIG. 16A with the depth data converting method of FIG. 17.

Comparing FIGS. 16A and 18, a frame of Pinocchio's nose displayed in a region A1 of FIG. 18 is thinner and clearer than that of FIG. 16A. Therefore, by using the depth data converting method of FIG. 17, a thickness of a frame of an object may be reduced in realizing 3D image data.

Referring again to FIG. 17, in 3D image data that is rendered in the display plane Im_Plane with 2D image data and converted depth data, 3D image data obtained by processing a blank data section BLK using the hole filling method are respectively illustrated in first and second display planes Im_Plane' and Im_Plane".

In the first display plane Im_Plane', a hole filling process is performed in the same direction Df1 as the rendering direction Dscan2, data (e.g., the same data as the first 3D data TH1) adjacent to the left of a blank data section BLK is generated in the blank data section BLK in the first display plane Im_Plane'. Therefore, the blank data section BLK is filled with the first 3D data TH1.

On the other hand, in the second display plane Im_Plane", the hole filling process is performed in a direction Df2 opposite to the rendering direction Dscan2, data (e.g., the same data as a portion TH1' of the first 3D data) adjacent to the right of the blank data section BLK is generated in the blank data section BLK in the second display plane Im_Plane". Therefore, the blank data section BLK is filled with the portion TH1' of the first 3D data TH1.

A difference between images respectively displayed in the first and second display planes Im_Plane' and Im_Plane" will be described below with reference to FIGS. 19 and 20.

Figure 19:
FIG. 19 is an image showing a 3D image generated by a hole filling method illustrated in a first display plane of FIG. 17.

FIG. 19 is a diagram showing a 3D image generated by a hole filling method illustrated in a first display plane Im_Plane' of FIG. 17.

Referring to FIG. 19, a pattern such as a combed pattern is formed between characters in an image displayed as "Packard" in a third region A3. This occurs because data of the blank data section BLK is generated as data equal to that of an adjacent character when characters of depth data having a high grayscale level are disposed adjacent to each other.

For example, in FIG. 17, when the depth data of the first 3D data TH1 is adjacent to data having a high grayscale level, the blank data section BLK is filled with the first 3D data TH1. As a result, a wave pattern may appear as in FIG. 19.

Figure 20:
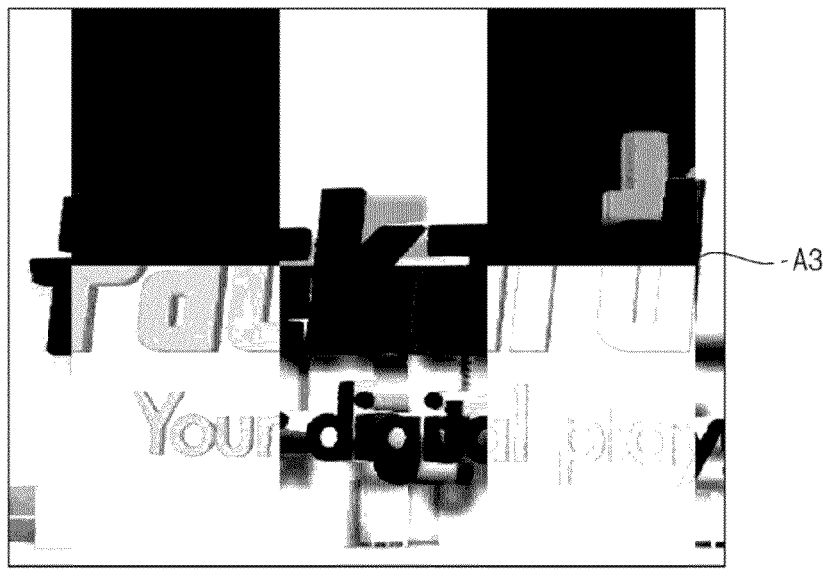
FIG. 20 is an image showing a 3D image generated by a hole filling method illustrated in a second display plane of FIG. 17.

FIG. 20 is a diagram showing a 3D image generated by a hole filling method illustrated in a second display plane Im_Plane" of FIG. 17.

Comparing FIGS. 19 and 20, a pattern, such as a combed pattern does not appear between characters an image displayed as "Packard" in a third region A3 as shown in FIG. 20. In the second display planes Im_Plane" of FIG. 17, by performing the hole filling process in a direction opposite to that in the first display planes Im_Plane', moved background data as in a character, namely, the same data as the portion TH1' of the first 3D data may be generated as the 3D data of the blank data section BLK. Therefore, when performing the hole filling process is applied in the direction opposite to the rendering direction, a combed pattern as in FIG. 19 may be substantially prevented.

In FIGS. 10A to 20, an exemplary rendering method for converting the image data to 3D data has been described without distinction between the first sub-frame and the second sub-frame. In the time-division driving mode, the receiver 311 of the frame rate converter 310 shown in FIG. 7 receives the first image signal RGB1 of one frame and sequentially outputs the first sub-image signal IRGB1 of the first sub-frame and the second sub-image signal IRGB2 of the second sub-frame. For the first sub-frame, the filtering unit 312, the depth data conversion unit 313, the image signal generation unit 314, and the output unit 315 performs the rendering on the first sub-image signal IRGB1 output from the receiver 311 to output the second image signal RGB2. For the second sub-frame, the filtering unit 312, the depth data conversion unit 313, the image signal generation unit 314, and the output unit 315 performs the rendering on the second sub-image signal IRGB2 output from the receiver 311 to output the second image signal RGB2. Thus, the first image signal RGB1 of one frame may be converted to the second image signal RGB2 in each of the first and second sub-frames. As a result, a multi-viewpoint display apparatus may be operated in the time-division driving method.

Although exemplary embodiments of the present invention have been described, it is understood that the present disclosure should not be limited thereto, and various changes and modifications can be made by one having ordinary skilled in the art within the spirit and scope of the present disclosure.

What is claimed is:

1. A display apparatus comprising:
a display panel configured to include a plurality of pixels and display an image having a plurality of viewpoints in response to a data signal and a control signal;
a converter configured to receive a first image signal and a first control signal, the first image signal including an image data and a depth data corresponding to the image data,
the converter further configured to generate a converted depth data corresponding to a predetermined pixel on the basis of the first image signal, and output a second image signal having the viewpoints and a second control signal based on the image data and the converted depth data, wherein the converter outputs the depth data having a highest value among the depth data corresponding to respective the image data supplied to 14 pixels adjacent to the predetermined pixel as the converted depth data, wherein the 14 pixels adjacent to the predetermined pixel are included in a pixel group together with the predetermined pixel, the 14 pixels and the predetermined pixel being arranged in three rows by five columns in the pixel group, and the predetermined pixel is positioned at a second row and a first column or at a second row and a fifth column; and
a driver configured to receive the second image signal and the second control signal and output the data signal and the control signal to the display panel,
wherein the image data is categorized into
an image data for a first viewpoint, which is supplied rightward from a display plane of the display panel, and
an image data for a second viewpoint, which is supplied leftward from the display plane of the display panel,
wherein from the first viewpoint the image data is supplied to each of the pixels, and the predetermined pixel is positioned at the second row and fifth column, and
wherein from the second viewpoint the image data is supplied to each of the pixels, and the predetermined pixel is positioned at the second row and the first column.

2. The display apparatus of claim 1, wherein the viewpoints include eight viewpoints.

3. The display apparatus of claim 1, wherein the image data is converted to three-dimensional image data corresponding to each of the viewpoints using the converted depth data.

4. The display apparatus of claim 1, further comprising:
a lens plate configured to include a plurality of lenses, the lenses being disposed on the display panel to display a three-dimensional image; and
a lens driving unit configured to move the lenses to positions corresponding to a first sub-frame or a second sub-frame in response to a lens control signal.

5. The display apparatus of claim 4, wherein the converter converts the image data to a first sub-image signal and a second sub-image signal respectively corresponding to the first and second sub-frames and outputs the lens control signal.

6. The display apparatus of claim 5, wherein the driver outputs the lens control signal and the second image signal in response to the first and second sub-image signals.

7. The display apparatus of claim 6, wherein the converter
performs rendering of the image data and the depth data corresponding to the image data with reference to a first look-up table to output the second image signal during the first sub-frame, and
performs rendering of the image data and the depth data corresponding to the image data with reference to a second look-up table to output the second image signal during the second sub-frame.

8. The display apparatus of claim 7, wherein the converter
reads out the depth data and a moving distance information in accordance with the viewpoints from the first look-up table to convert the image data to the second image signal according to the moving distance information during the first sub-frame, and
reads out the depth data and the moving distance information in accordance with the viewpoints from the second look-up table during the second sub-frame to convert the image data to the second image signal according to the moving distance information during the second sub-frame.

9. The display apparatus of claim 8, wherein the image converter
outputs the second image signal corresponding to odd-numbered viewpoints of the viewpoints during the first sub-frame, and outputs the second image signal corresponding to even-numbered viewpoints of the viewpoints during the second sub-frame.

10. The display apparatus of claim 8, wherein, responsive to the lens control signal, the lens driving unit
moves the lenses to a first position during the first sub-frame and
moves the lenses to a second position during the second sub-frame.

11. The display apparatus of claim 10, wherein the lenses are
extended in a direction substantially parallel to a column direction of the pixels and are
movable in a direction substantially perpendicular to the extended direction of the lenses.

12. The display apparatus of claim 11, wherein
the lens plate is a liquid crystal lens panel, and
the lenses are defined by an electric field applied to the liquid crystal lens panel.

13. A method of displaying a three-dimensional image on a display apparatus having a plurality of pixels, comprising:
receiving a first image signal including an image data and a depth data corresponding to the image data;
generating a converted depth data corresponding to a predetermined pixel based on the first image signal, including outputting a depth data having a highest value among the depth data corresponding to respective image data supplied to 14 pixels adjacent to the predetermined pixel as the converted depth data, wherein the 14 pixels adjacent to the predetermined pixel are included in a pixel group together with the predetermined pixel, the 14 pixels and the predetermined pixel being arranged in three rows by five columns in the pixel group, and the predetermined pixel is positioned at a second row and a first column or at a second row and a fifth column;
generating a second image signal having a plurality of viewpoints based on the image data and the converted depth data; and
controlling the second image signal to be displayed on the pixels,
wherein, the image data is categorized into
an image data for a first viewpoint, which is supplied rightward from a display plane of the display panel, and
an image data for a second viewpoint, which is supplied leftward from the display plane of the display panel, when viewed from the display panel,
wherein from the first viewpoint the image data is supplied to each of the pixels, and the predetermined pixel is positioned at the second row and fifth column, and
wherein from the second viewpoint the image data is supplied to each of the pixels, and the predetermined pixel is positioned at the second row and the first column.

14. The method of claim 13, wherein the viewpoints include eight viewpoints.

15. The method of claim 13, further comprising anti-aliasing the converted depth data.

16. A method of displaying a three-dimensional image on a display apparatus having a plurality of pixels, comprising:
receiving a first image signal including an image data and a depth data corresponding to the image data;
generating a converted depth data corresponding to a predetermined pixel based on the first image signal, including outputting a depth data having a highest value among the depth data corresponding to respective image data supplied to a certain number of pixels adjacent to the predetermined pixel as the converted depth data, converting the image data into three-dimensional image data corresponding to each of the viewpoints based on the converted depth data; and supplying a pixel having no corresponding three-dimensional image data, a three-dimensional image data of an adjacent pixel in generating the second image signal;
generating a second image signal having a plurality of viewpoints based on the image data and the converted depth data; and
controlling the second image signal to be displayed on the pixels,
wherein the three-dimensional image data corresponding to each of the viewpoints is categorized into
three-dimensional image data for a right viewpoint supplied rightward from a display plane of the display apparatus and
three-dimensional image data for a left viewpoint supplied leftward from the display plane of the display apparatus,
wherein from the right viewpoint, the three-dimensional image data, which corresponds to a pixel adjacent to a right of the pixel having no corresponding the three-dimensional image data is converted to the second image signal and supplied to the pixel having no corresponding three-dimensional image data, and
wherein from the left viewpoint, the three-dimensional image data, which corresponds to a pixel adjacent to a left of the pixel having no corresponding three-dimensional image data, is converted to the second image signal and supplied to the pixel having no corresponding three-dimensional image data.

* * * * *